(12) United States Patent
Miyamoto et al.

(10) Patent No.: US 12,169,604 B2
(45) Date of Patent: Dec. 17, 2024

(54) ACTIVE PEN, POSITION DETECTION SYSTEM, AND INTEGRATED CIRCUIT

(71) Applicant: Wacom Co., Ltd., Saitama (JP)

(72) Inventors: Masayuki Miyamoto, Saitama (JP); Haruhiko Hisano, Saitama (JP); Sadao Yamamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/457,132

(22) Filed: Aug. 28, 2023

(65) Prior Publication Data

US 2023/0400944 A1 Dec. 14, 2023

Related U.S. Application Data

(63) Continuation of application No. PCT/JP2021/032891, filed on Sep. 7, 2021.

(30) Foreign Application Priority Data

Apr. 19, 2021 (JP) ................................. 2021-070522

(51) Int. Cl.
*G06F 3/041* (2006.01)
*G06F 3/0354* (2013.01)
*G06F 3/044* (2006.01)

(52) U.S. Cl.
CPC ...... *G06F 3/04162* (2019.05); *G06F 3/03545* (2013.01); *G06F 3/0441* (2019.05); *G06F 3/0442* (2019.05)

(58) Field of Classification Search
CPC ............. G06F 3/04162; G06F 3/03545; G06F 3/0441; G06F 3/0442; G06F 3/0383
See application file for complete search history.

(56) References Cited

U.S. PATENT DOCUMENTS

| 2019/0204939 A1* | 7/2019 | Ju ........................ G06F 3/04162 |
| 2020/0201505 A1* | 6/2020 | Jung ..................... G06F 3/0383 |
| 2020/0225772 A1* | 7/2020 | Koike ................. G06F 3/03545 |

FOREIGN PATENT DOCUMENTS

| JP | 6487782 B2 | 3/2019 |
| WO | WO 2016117004 A1 | 7/2016 |
| WO | WO 2020256845 A1 | 12/2020 |

OTHER PUBLICATIONS

International Search Report, mailed Dec. 14, 2021, for PCT Application No. PCT/JP2021/032891. (4 pages) (English translation).

* cited by examiner

*Primary Examiner* — Sanjiv D. Patel
(74) *Attorney, Agent, or Firm* — Seed IP Law Group LLP

(57) ABSTRACT

To prevent drawing by pen input from stopping due to a failure in receiving an uplink signal, an active pen according to the present disclosure includes a processing circuit that transmits, at a second timing decided based on a first timing of a first uplink signal received from a sensor controller, a position signal and a data signal from a pen-tip electrode and receives a second uplink signal, and a wireless communication circuit that wirelessly communicates with the sensor controller. The processing circuit determines whether the second uplink signal has been received at the second timing, and in a case of determining that the second uplink signal has not been received, the processing circuit transmits at least part of the data signal via the wireless communication circuit while transmitting the position signal from the pen-tip electrode.

23 Claims, 11 Drawing Sheets

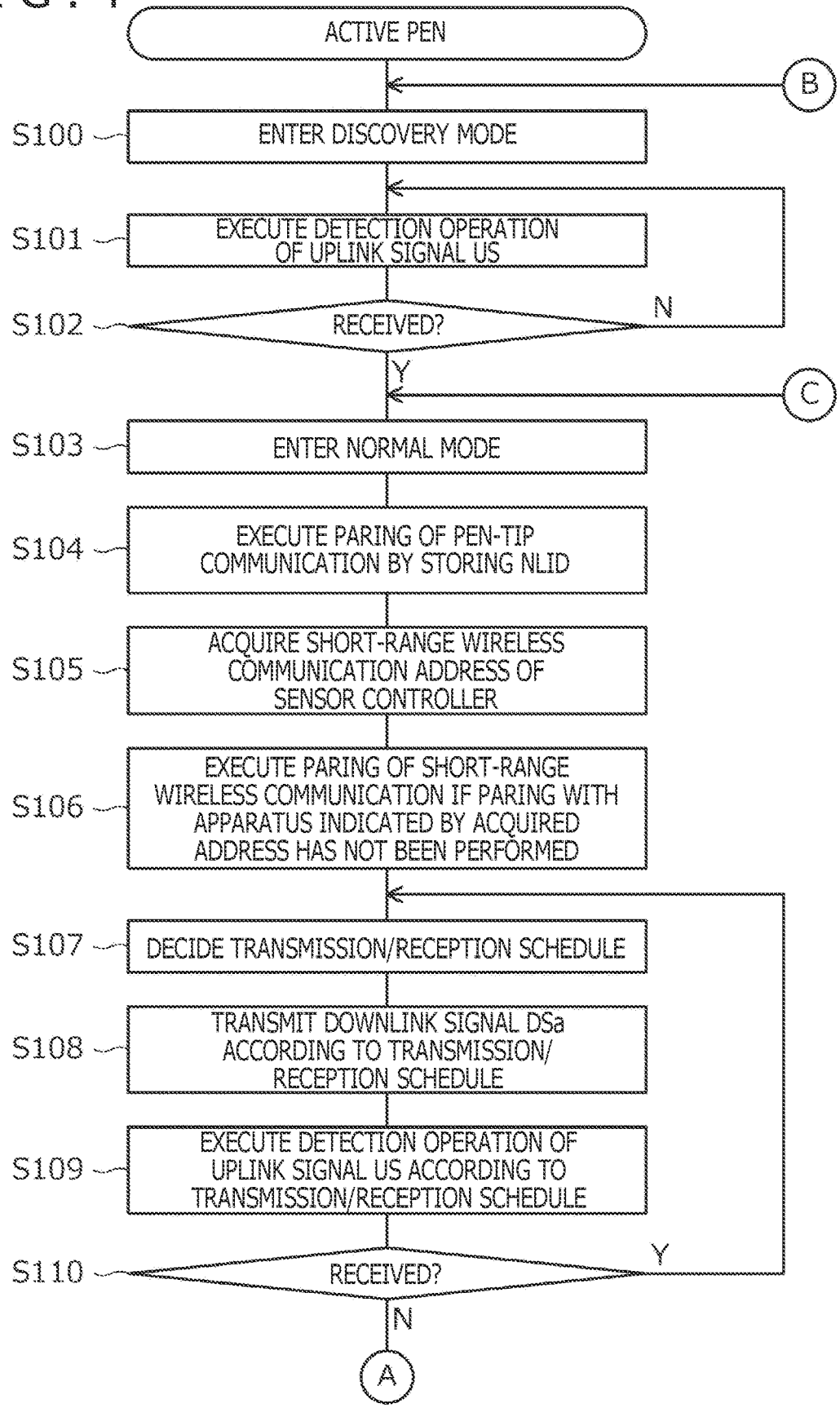

FIG.13
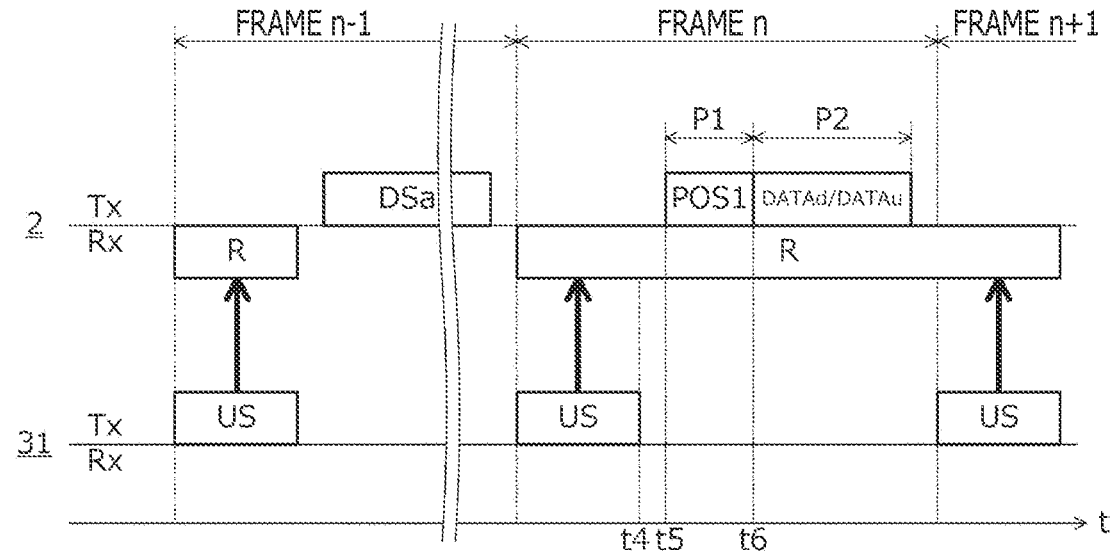
FIG.14
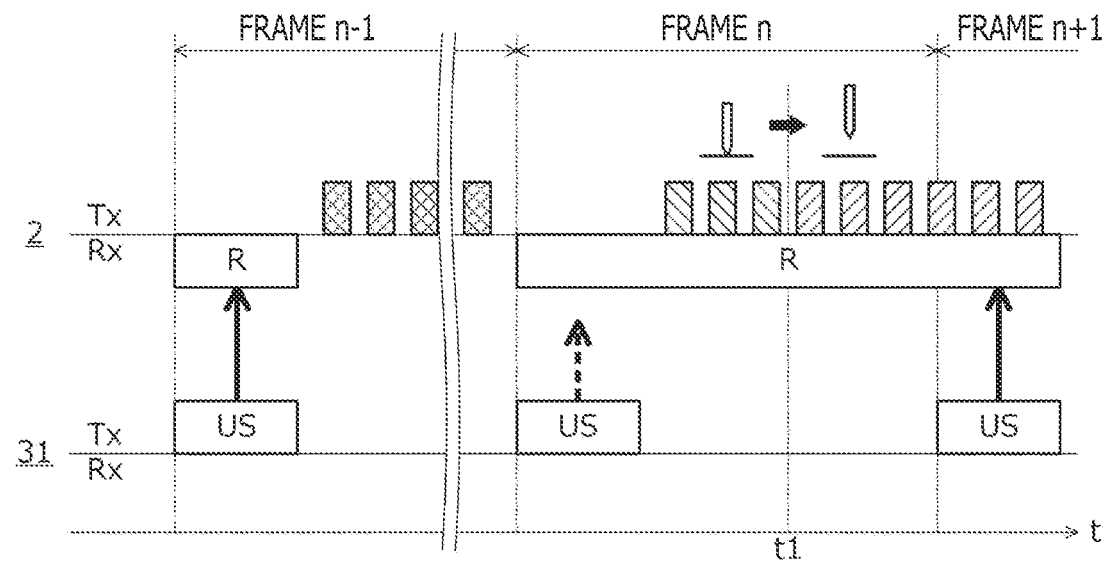
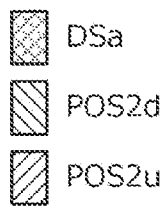

ACTIVE PEN, POSITION DETECTION SYSTEM, AND INTEGRATED CIRCUIT

BACKGROUND

Technical Field

The present disclosure relates to an active pen, a position detection system, and an integrated circuit, and particularly to an active pen that mutually and bidirectionally communicates with a sensor controller, to an integrated circuit used for such an active pen, and to a position detection system including such an active pen and a sensor controller.

Description of the Related Art

There has been known an active pen that is configured to bidirectionally transmit and receive signals to/from a sensor controller in a position detection device through an electrode (hereinafter, referred to a "pen-tip electrode") provided at a pen tip. Hereinafter, the communication performed through the pen-tip electrode in this way will be referred to as "pen-tip communication." In addition, the signal transmitted from the sensor controller to the active pen will be referred to as an "uplink signal," and the signal transmitted from the active pen to the sensor controller will be referred to as a "downlink signal."

The downlink signal serves as a position signal to cause the sensor controller to detect the position of the active pen and as a data signal to transmit data in the active pen to the sensor controller. The sensor controller that performs the pen-tip communication is configured to detect the position of the active pen on the basis of the reception intensity of the downlink signal at each of a plurality of sensor electrodes provided in a touch surface and to receive the data transmitted by the active pen, by demodulating the downlink signal detected at any of the sensor electrodes. The position detected and the data received by the sensor controller are supplied to a host processor and used for drawing by pen input.

In addition, in recent years, an electronic pen adapted to short-range wireless communication such as Bluetooth (registered trademark) has emerged. Patent Documents 1 and 2 disclose examples of such an electronic pen. The electronic pen described in Patent Document 1 is configured to perform initial settings on the basis of information received from a position detection device through short-range wireless communication and to be able to transmit pen pressure information, side switch information, and identification information ID through short-range wireless communication. In the electronic pen described in Patent Document 2, short-range wireless communication is used to switch the function of the electronic pen, for example, from "draw" to "erase."

PRIOR ART DOCUMENT

Patent Documents

Patent Document 1: Japanese Patent No. 6487782
Patent Document 2: U.S. Pat. No. 9,924,019

BRIEF SUMMARY

Technical Problem

Incidentally, the sensor controller is configured to periodically transmit the uplink signal, and the active pen is configured to transmit, by using the reception timing of the uplink signal as the reference time, the downlink signal and receive a next uplink signal. Therefore, in order for the active pen to function normally, it is necessary that the uplink signal has been received.

However, noise such as a signal to drive, for example, pixels of a display is superimposed on the uplink signal in some cases, and as a result, the active pen may fail to receive the uplink signal. The active pen is then unable to transmit at least the downlink signal as a data signal. This is because the sensor controller and the active pen need to be synchronized with each other in order for the sensor controller to correctly receive the data signal. Improvements have been needed because drawing by pen input stops if the active pen cannot transmit the data signal.

Therefore, one of the objects of the present disclosure is to provide an active pen, a position detection system, and an integrated circuit that can prevent drawing by pen input from stopping due to a failure in receiving an uplink signal.

In addition, a conventional sensor controller determines whether or not the active pen is in contact with the touch surface, on the basis of a pen pressure value included in a data signal. Hereinafter, information indicating the determination result will be referred to as "contact state information." The contact state information is information indicating either a state (hovering state) in which the active pen is not in contact with the touch surface or a state (contact state) in which the active pen is not in contact with the touch surface.

However, since the transmission of the data signal by the active pen is intermittently performed, a delay may occur in updating the contact state information by the sensor controller according to the above determination method. In addition, in a case where the active pen transmits the data signal via short-range wireless communication instead of the pen-tip communication, a communication delay also causes a delay in updating the contact state information.

Therefore, another object of the present disclosure is to provide an active pen and a position detection system that can suppress the occurrence of a delay in updating the contact state information by the sensor controller.

Technical Solution

An active pen according to a first aspect of the present disclosure is an active pen including a signal processing circuit which, in operation, transmits, at a second timing decided based on a first timing of reception of a first uplink signal received from a sensor controller, a position signal and a data signal from a pen-tip electrode, and receives a second uplink signal, and a first wireless communication circuit which, in operation, wirelessly communicates with the sensor controller. The signal processing circuit determines whether the second uplink signal has been received at the second timing, and in a case of determining that the second uplink signal has not been received, the signal processing circuit transmits at least part of the data signal via the first wireless communication circuit while transmitting the position signal from the pen-tip electrode.

A position detection system according to the first aspect of the present disclosure is a position detection system including the active pen and the sensor controller. The sensor controller outputs data indicated by the data signal transmitted by the active pen from the pen-tip electrode and data indicated by the data signal transmitted by the active pen via the first wireless communication circuit, to a host processor as data from the same active pen.

An integrated circuit according to the first aspect of the present disclosure is an integrated circuit that is used with an active pen. The integrated circuit includes a signal processing circuit which, in operation, transmits, at a second timing decided based on a first timing of reception of a first uplink signal received from a sensor controller, a position signal and a data signal from a pen-tip electrode, and receives a second uplink signal, and a first wireless communication circuit which, in operation, wirelessly communicates with the sensor controller. The signal processing circuit, in operation, determines whether the second uplink signal has been received at the second timing, and in a case where the signal processing circuit determines that the second uplink signal has not been received, at least part of the data signal is transmitted via the first wireless communication circuit while the position signal is transmitted from the pen-tip electrode.

An active pen according to a second aspect of the present disclosure is an active pen including a processing circuit which, in operation, generates a downlink signal to be transmitted to a sensor controller, and a transmission circuit which, in operation, transmits the downlink signal by changing a potential of an electrode provided at a pen tip. The processing circuit, in operation, performs a carrier modulation process in which, while the downlink signal is generated based on a first carrier signal in a case where the active pen is in a contact state, the downlink signal is generated based on a second carrier signal different from the first carrier signal in a case where the active pen is in a hovering state.

A position detection system according to the second aspect of the present disclosure is a position detection system including the active pen and the sensor controller. The sensor controller, in operation, determines whether a carrier signal of the downlink signal received from the active pen is the first carrier signal or the second carrier signal, and determines whether the active pen is in contact with a touch surface, based on a result of determining whether the carrier signal of the downlink signal received from the active pen is the first carrier signal or the second carrier signal.

Advantageous Effect

According to the first aspect of the present disclosure, even if the uplink signal is not received and the active pen cannot transmit the data signal from the pen-tip electrode, the sensor controller can detect the position of the active pen by using the position signal transmitted from the pen-tip electrode, and can receive the transmission data of the active pen via the short-range wireless communication. Therefore, it is possible to prevent the drawing by pen input from stopping due to a failure in receiving the uplink signal.

According to the second aspect of the present disclosure, since the contact state information can be transmitted by the carrier signal of the downlink signal, it is possible to suppress the occurrence of a delay in updating the contact state information by the sensor controller.

BRIEF DESCRIPTION OF THE SEVERAL VIEWS OF THE DRAWINGS

FIG. 4 is a processing flow diagram for illustrating a process performed by the processing circuit 26d of the active pen 2.

FIG. 13 is a diagram for illustrating signals transmitted and received between the active pen 2 and the sensor controller 31 that configure a position detection system 1 according to a modified example of the third embodiment of the present disclosure.

FIG. 14 is a diagram for illustrating signals transmitted and received between the active pen 2 and the sensor controller 31 in a case where transmission and reception of the uplink signal US and the downlink signal DS are executed in time slot units.

DETAILED DESCRIPTION

Hereinafter, preferred embodiments of the present disclosure will be described in detail with reference to the attached drawings.

Figure 1:
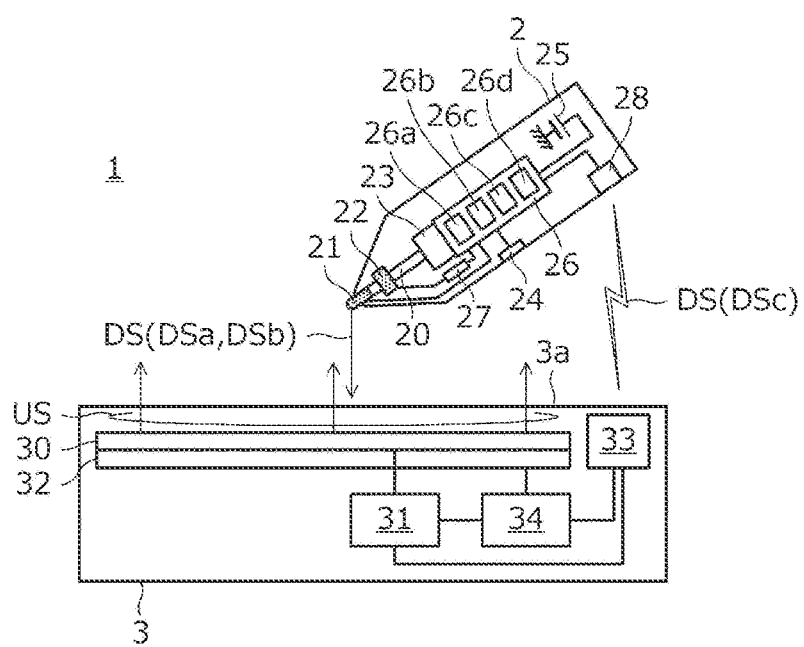
FIG. 1 is a diagram for illustrating a configuration of a position detection system 1 according to a first embodiment of the present disclosure.

FIG. 1 is a diagram for illustrating a configuration of a position detection system 1 according to a first embodiment of the present disclosure. As illustrated in FIG. 1, the position detection system 1 includes an active pen 2 and an electronic apparatus 3 that is a position detection device for detecting the active pen 2.

The electronic apparatus 3 is, for example, a computer having a touch surface 3a, such as a tablet computer or a digitizer. Inside the electronic apparatus 3, provided are a sensor 30 arranged just below the touch surface 3a, a sensor controller 31 connected to the sensor 30, a display 32 arranged to be superimposed on the sensor 30, a wireless communication circuit 33 (second wireless communication circuit), and a host processor 34 for controlling each circuit of the electronic apparatus 3 including these.

The host processor 34 is a central processing unit of the electronic apparatus 3, and is configured to read and execute various kinds of programs from a memory, which is not illustrated. The programs executed in this way include various kinds of applications including an operating system of the electronic apparatus 3 and a drawing application. Among these, the drawing application is a program for executing a process of generating digital ink on the basis of the position and data supplied from the sensor controller 31 and storing it in the memory in the electronic apparatus 3 and a process of rendering the generated digital ink, generating a video signal indicating the result, and supplying it to the display 32. The display 32 is a device for displaying a video signal supplied from the host processor 34, and includes, for example, a liquid crystal display or an organic electroluminescent (EL) display.

The sensor controller 31 is an integrated circuit having a function of deriving the position of the active pen 2 in the touch surface 3a by bidirectionally communicating with the active pen 2, acquiring data from the active pen 2, and supplying the derived position and the acquired data to the host processor 34 each time. In principle, the communication between the sensor controller 31 and the active pen 2 is executed via the pen-tip communication described above, but short-range wireless communication is also used depending on the situation.

Specifically, the communication from the sensor controller 31 to the active pen 2 is executed via the pen-tip communication. Hereinafter, the signal transmitted from the sensor controller 31 to the active pen 2 for this communication will be referred to as an "uplink signal US." On the other hand, the communication from the active pen 2 to the sensor controller 31 is executed via the pen-tip communication in principle, but short-range wireless communication is used together only in a case where the active pen 2 fails to receive the uplink signal US. Hereafter, the signal transmitted via the pen-tip communication by the active pen 2 that has successfully received the uplink signal US will be referred to as a "downlink signal DSa," the signal transmitted via the pen-tip communication by the active pen 2 that has failed to receive the uplink signal US will be referred to as a "downlink signal DSb," and the signal transmitted via the short-range wireless communication by the active pen 2 that has failed to receive the uplink signal US will be referred to as a "downlink signal DSc." In addition, in a case where it is not necessary to distinguish them from each other, a "downlink signal DS" is used as a generic term for the downlink signals DSa, DSb, and DSc.

The sensor 30 is a device having a structure in which a plurality of sensor electrodes are arranged in the touch surface 3a. The pen-tip communication is executed via communication of a capacitive coupling method performed through capacitance formed between the plurality of sensor electrodes and electrodes (a pen-tip electrode 21 and a ring electrode 22 to be described later) on the active pen 2 side. The sensor controller 31 transmits the uplink signal US by applying a change to the potential of each sensor electrode, while receiving the downlink signals DSa and DSb by detecting a change in the potential of each sensor electrode.

Here, some of the plurality of sensor electrodes configuring the sensor 30 can be used as a common electrode (an electrode for supplying ground potential to each pixel in common) of the display 32. The electronic apparatus 3 that adopts this usage configures what is generally called an "in-cell type" position detection device. On the other hand, the electronic apparatus 3 that does not adopt this usage configures what is generally called an "on-cell type" or "out-cell type" position detection device. The present disclosure is preferably applicable to any electronic apparatus 3.

The wireless communication circuit 33 is, for example, a communication device for performing short-range wireless communication such as Bluetooth (registered trademark), and is connected to the sensor controller 31 and the host processor 34. The host processor 34 performs control of the wireless communication circuit 33, including pairing with the communication partner, and performs, through the wireless communication circuit 33, short-range wireless communication for general use such as connection of a keyboard, a mouse, a speaker, and a headphone. Meanwhile, the sensor controller 31 uses the wireless communication circuit 33 to receive the downlink signal DSc via the short-range wireless communication.

As illustrated in FIG. 1, the active pen 2 has a core body 20, a pen-tip electrode 21, a ring electrode 22, a pressure sensor 23, a side switch 24, a battery 25, an integrated circuit 26, a stop filter 27, and a wireless communication circuit 28 (first wireless communication circuit). The core body 20 is a member configuring the pen shaft of the active pen 2. The tip of the core body 20 configures the pen tip of the active pen 2, and the end thereof abuts on the pressure sensor 23. The pen-tip electrode 21 and the ring electrode 22 are conductors provided at positions different from each other in the pen tip. More specifically, the pen-tip electrode 21 is arranged at the tip of the core body 20 of the active pen 2, and the ring electrode 22 is arranged at a position closer to the center of the active pen 2 relative to the pen-tip electrode 21 in such a manner as to surround the core body 20.

The pressure sensor 23 is a sensor that detects a pressure applied to the tip (pen tip) of the core body 20. The pressure detected by the pressure sensor 23 is supplied to the integrated circuit 26 as, for example, a 12-bit pen pressure value. The side switch 24 is a push-button switch provided on the surface of the active pen 2, and is configured such that the user can turn on and off. The operating state (on/off state) of the side switch 24 is supplied to the integrated circuit 26 as, for example, 2-bit switch information. The battery 25 serves to supply electric power required for the integrated circuit 26 to operate.

The wireless communication circuit 28 is, for example, a communication device for performing short-range wireless communication such as Bluetooth (registered trademark). The active pen 2 uses the wireless communication circuit 28 to transmit the downlink signal DSc to the sensor controller 31.

The integrated circuit 26 is an integrated circuit having various circuits including a boost circuit 26a, a transmission circuit 26b, a reception circuit 26c, and a processing circuit 26d. The transmission circuit 26b is connected to the pen-tip electrode 21, and serves to transmit the downlink signals DSa and DSb by applying a change to the potential of the pen-tip electrode 21 with use of the boost circuit 26a. The reception circuit 26c is connected to the ring electrode 22, and serves to receive the uplink signal US by detecting a change in the potential of the ring electrode 22.

The processing circuit 26d is a circuit (signal processing circuit) that executes a process according to the uplink signal US received by the reception circuit 26c. This process includes a process of deciding, by using the reception timing of the uplink signal US as the reference time, the transmission/reception schedule of the downlink signal DS and a next uplink signal US, a process of generating the downlink signal DS according to a command from the sensor controller 31 and causing the transmission circuit 26b or the wireless communication circuit 28 to transmit the generated downlink signal DS, and a process of causing the reception circuit 26c to receive the next uplink signal US.

Figure 2:
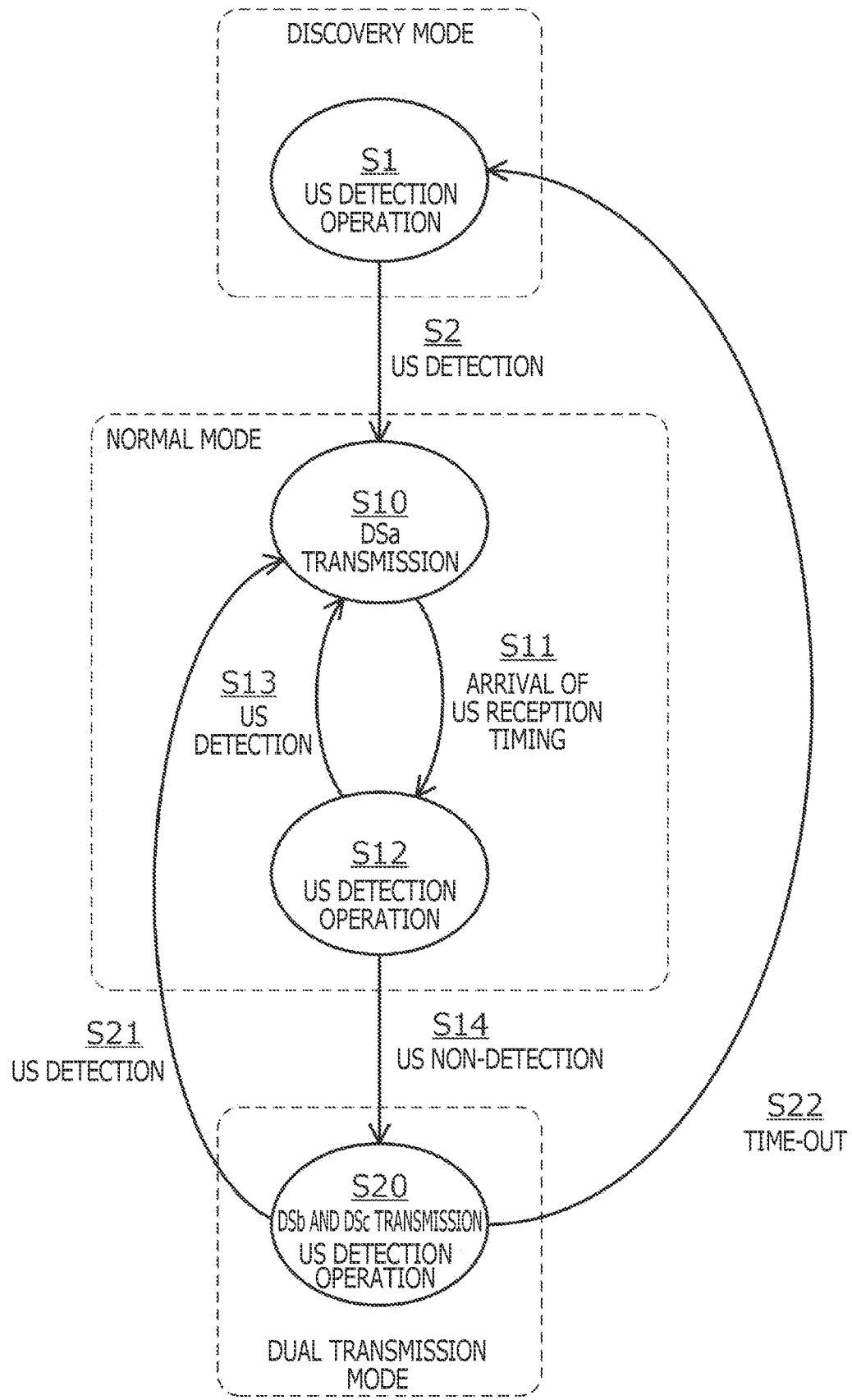
FIG. 2 is a state transition diagram of a processing circuit 26d of an active pen 2.

FIG. 2 is a state transition diagram of the processing circuit 26d. As illustrated in FIG. 2, the processing circuit 26d is configured to operate in any of a discovery mode, a normal mode, and a dual transmission mode. The initial state is the discovery mode, and the processing circuit 26d which has entered the discovery mode continuously or intermittently causes the reception circuit 26c to perform a detection operation of the uplink signal US (Step S1).

In a case where the uplink signal US has been detected as a result of the detection operation in Step S1, the processing circuit 26d enters the normal mode (Step S2). Then, by using the reception timing of the uplink signal US as the reference time, the transmission/reception schedule of the downlink signal DS and the next uplink signal US is decided, and the transmission circuit 26b is caused to transmit the downlink signal DSa according to the decided schedule (Step S10), and in a case where the reception timing of the next uplink signal US has arrived (Step S11), the reception circuit 26c is caused to perform the detection operation of the next uplink signal US (Step S12). In a case where the next uplink signal US has been detected as a result (Step S13), the transmission/reception schedule is decided anew by using the reception timing of the uplink signal US as the reference time, and the process of Step S10 is repeated.

On the other hand, in a case where the uplink signal has not been detected as a result of the detection operation in Step S12, the processing circuit 26d enters the dual transmission mode (Step S14). The processing circuit 26d in the dual transmission mode generates the downlink signal DSb and causes the transmission circuit 26b to transmit the generated downlink signal DSb, and also generates the downlink signal DSc and causes the wireless communication circuit 28 to transmit the generated downlink signal DSc (Step S20). In addition, in Step S20, the reception circuit 26c is also caused to perform the detection operation of the uplink signal US in parallel with the transmission of the downlink signals DSb and DSc. This parallel process is realized by the stop filter 27 illustrated in FIG. 1, and the details thereof will be described later.

In a case where the uplink signal US has been detected in Step S20, the processing circuit 26d returns to the normal mode (Step S21). Then, the transmission/reception schedule is decided anew by using the reception timing of the uplink signal US as the reference time, and the process of Step S10 is repeated. On the other hand, in a case where an undetected state of the uplink signal US has continued for a predetermined time, the processing circuit 26d returns to the discovery mode to continue the process (Step S22). In this case, the transmission of the downlink signal DS stops.

Return to FIG. 1. The processing circuit 26d includes an oscillation circuit that generates a clock signal of a predetermined frequency and a frequency division circuit that generates a carrier signal by dividing the frequency of the clock signal generated by the oscillation circuit. The predetermined frequency is, for example, 8 MHz. For example, in a case where the frequency division ratio of the frequency division circuit is 20, the frequency of the carrier signal is 400 kHz that is obtained by dividing 8 MHz by 20. The processing circuit 26d is configured to generate the downlink signals DSa and DSb on the basis of the carrier signal generated by the frequency division circuit. In addition, the processing circuit 26d has a function of changing the frequency division ratio of the frequency division circuit.

The stop filter 27 is a filter circuit inserted between the ring electrode 22 and the integrated circuit 26 to simultaneously enable the detection of the uplink signal US, the detection using the ring electrode 22, and the transmission of the downlink signal DSb from the pen-tip electrode 21. Specifically, since the potential rise by the boost circuit 26a used to transmit the downlink signal DS reaches up to 18 to 20 V, a change in the potential of the pen-tip electrode 21, the change accompanying the transmission of the downlink signal DS, also affects the reception circuit 26c. As a result, since the downlink signal DSb is superimposed on the potential of the uplink signal US detected by the reception circuit 26c, it becomes difficult to detect the uplink signal US simultaneously with the transmission of the downlink signal DSb. In a case where the active pen 2 is in a hovering state (state where the pen tip is away from the touch surface 3a) and the ring electrode 22 is far from the sensor 30, the detection of the uplink signal US becomes more difficult because the reception intensity of the uplink signal US decreases. The stop filter 27 serves to prevent the change in the potential of the pen-tip electrode 21, the change accompanying the transmission of the downlink signal DSb, from affecting the potential of the uplink signal US detected by the reception circuit 26c in the integrated circuit 26, thereby simultaneously enabling the detection of the uplink signal US, the detection using the ring electrode 22, and the transmission of the downlink signal DSb from the pen-tip electrode 21.

As a specific configuration of the stop filter 27, various kinds of configurations can be adopted. For example, in a case where the downlink signal DSb includes a signal based on a sine wave, the stop filter 27 can include a band stop filter (notch filter) that blocks a specific frequency band including the frequency of the downlink signal DSb. In addition, in a case where the downlink signal DSb includes a pulse wave, the stop filter 27 can also include a high-pass filter configured to block the pulse wave configuring the downlink signal DSb while passing the pulse wave configuring the uplink signal US. Further, a mute circuit for muting the edge of the downlink signal DSb may be provided in a rear stage of the high-pass filter, or the downlink signal DSb may be removed from the signal arriving at the ring electrode 22 by configuring the stop filter 27 using a combination of a gain circuit and a differential circuit or a combination of a finite impulse response (FIR) filter, a subtractor, and a feedback circuit.

FIGS. 3A to 3E are diagrams for illustrating the formats of the uplink signal US and the downlink signals DSa, DSb, and DSc. First, with reference to FIG. 3A, the uplink signal US has local identifiers LID and NLID, a command COM, and an error detection code CRC.

The local identifiers LID and NLID are identification information given by the sensor controller 31 to the active pen 2 that becomes the partner of the pen-tip communication. The active pen 2 which has not yet started communication with the sensor controller 31 extracts the local identifier NLID from the uplink signal US detected as a result of the detection operation and stores the extracted local identifier NLID as its own local identifier to perform pairing with the sensor controller 31.

The command COM is information indicating a command for the active pen 2. The local identifier LID arranged at the beginning of the command COM indicates the destination of the command COM. The active pen 2 which has received the uplink signal US first refers to the local identifier LID and determines whether or not the local identifier LID matches the stored local identifier. As a result, in a case where it is determined that they match each other, a process of generating a data signal DATA to be described later is performed according to the command COM.

Figure 3A:
FIG. 3A is a diagram for illustrating the format of an uplink signal US.
Figure 3B:
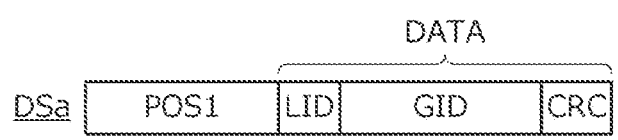
FIGS. 3B and 3C are diagrams each illustrating the format of a downlink signal DSa.
Figure 3C:
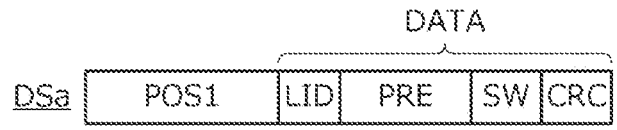

Next, with reference to FIG. 3B and FIG. 3C, the downlink signal DSa includes a position signal POS1 and the data signal DATA. The position signal POS1 is an unmodulated carrier signal (carrier signal generated by the frequency division circuit described above), and is used by the sensor controller 31 to detect the position of the active pen 2 in the touch surface 3a. The sensor controller 31 acquires the reception intensity of the position signal POS1 at each of the plurality of sensor electrodes configuring the sensor 30, and detects the position of the active pen 2 on the basis of the distribution thereof. Meanwhile, the data signal DATA is a signal obtained by modulating, by data transmitted from the active pen 2 to the sensor controller 31, the carrier signal generated by the frequency division circuit described above.

The downlink signal DSa illustrated in FIG. 3B is a signal transmitted by the active pen 2 immediately after storing the local identifier NLID described above. As illustrated in FIG. 3B, the downlink signal DSa in this case has the local identifier LID, a global identifier GID, and the error detection code CRC. Among these, the stored local identifier NLID is set to the local identifier LID. This point also similarly applies to other downlink signals DS to be described later. The global identifier GID is an identifier assigned to the active pen 2 at the stage of factory shipping and serves to notify the sensor controller 31 of the kind, function, version, and the like of the active pen 2. In a case where the downlink signal DSa including an unpaired local identifier LID, the sensor controller 31 extracts the local identifier LID and the global identifier GID therefrom and stores them in association with each other to perform pairing with the active pen 2.

The downlink signal DSa illustrated in FIG. 3C is a signal transmitted by the active pen 2 in a case where an instruction is not particularly given by the command COM. The active pen 2 is configured to periodically transmit the downlink signal DSa in a case where an instruction is not particularly given by the command COM. As illustrated in FIG. 3C, the downlink signal DSa in this case has the local identifier LID, a pen pressure value PRE, switch information SW, and the error detection code CRC. The pen pressure value PRE is information supplied from the pressure sensor 23 illustrated in FIG. 1 to the integrated circuit 26, and the switch information SW is information indicating the operating state of the side switch 24 illustrated in FIG. 1.

Figure 3D:
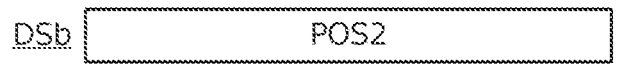
FIG. 3D is a diagram for illustrating the format of a downlink signal DSb.

Next, with reference to FIG. 3D, the downlink signal DSb includes only a position signal POS2 that is an unmodulated carrier signal similar to the position signal POS1. Since the downlink signal DSb is a signal transmitted when the active pen 2 loses the transmission timing of the downlink signal DS (that is, when the active pen 2 is not synchronized with the sensor controller 31), even if the data signal DATA is arranged in the downlink signal DSb, it cannot be expected that the sensor controller 31 can correctly demodulate. Meanwhile, since the position signal POS2 is, similarly to the position signal POS1 described above, used to detect the position of the active pen 2 on the basis of the distribution of the reception intensity at each of the plurality of sensor electrodes configuring the sensor 30, the sensor controller 31 does not need to demodulate the position signal POS2 at least to detect the position. Therefore, in the present embodiment, the active pen 2 is configured to transmit only the position signal POS2 as the downlink signal DSb, and the sensor controller 31 can thereby detect the position of the active pen 2 even if the active pen 2 and the sensor controller 31 are not synchronized with each other.

However, in the present embodiment, the position signal POS2 is also given the role of transmitting certain information to the sensor controller 31 in a possible range even if the active pen 2 and the sensor controller 31 are not synchronized with each other. The contents of the certain information represent, for example, 1-bit information indicating whether or not the active pen 2 is in contact with the touch surface 3a. This information is nothing less than the contact state information described above. In this case, the processing circuit 26d of the active pen 2 acquires the contact state information by determining, on the basis of the pen pressure value supplied from the pressure sensor 23 illustrated in FIG. 1, whether the active pen 2 is in contact with the touch surface 3a. Then, on the basis of the acquired contact state information, the position signal POS2 is modulated by any of frequency modulation, spread spectrum, and phase modulation.

Specifically, first, in a case where the frequency modulation is used, the processing circuit 26d makes the frequency of the position signal POS2 different by making the division ratio of the above-described frequency division circuit different between the case where the active pen 2 is in contact with the touch surface 3a and the case where the active pen 2 is not in contact with the touch surface 3a. In a typical example, it is preferable that the division ratio be 20 in a case where the active pen 2 is in contact with the touch surface 3a and 21 or 19 in a case where the active pen 2 is not in contact with the touch surface 3a. In this case, the frequency of the position signal POS2 in the case where the active pen 2 is in contact with the touch surface 3a is 400 kHz, and the frequency of the position signal POS2 in the case where the active pen 2 is not in contact with the touch surface 3a is 381 kHz or 421 kHz. The sensor controller 31 demodulates the information transmitted by the processing circuit 26d, by detecting the frequency of the position signal POS2 with use of asynchronous detection.

Next, in a case where the spread spectrum is used, the processing circuit 26d generates the position signal POS2 by using different spread codes between the case where the active pen 2 is in contact with the touch surface 3a and the case where the active pen 2 is not in contact with the touch surface 3a. The sensor controller 31 detects the spread code included in the position signal POS2, that is, the information transmitted by the processing circuit 26d, by continuously calculating the correlation with each of the two kinds of spread codes used by the processing circuit 26d.

Finally, in a case where the phase modulation is used, the processing circuit 26d is configured to generate the position signal POS2 by changing the phase for each predetermined period. Then, the processing circuit 26d sets the change amount of the phase to a different value according to whether or not the active pen 2 is in contact with the touch surface 3a. The sensor controller 31 demodulates the information transmitted by the processing circuit 26d, by detecting the change amount of the phase with use of delay detection.

When the processing circuit 26d transmits the contact state information as described above, the effect that the occurrence of a delay in updating the contact state information by the sensor controller 31 can be suppressed can also be obtained in the position detection system 1 according to the present embodiment. This point will be described in more detail later in a second embodiment, a third embodiment, and modified examples of these.

Figure 3E:
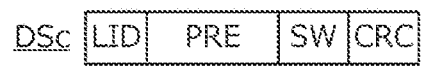
FIG. 3E is a diagram for illustrating the format of a downlink signal DSc.

Next, with reference to FIG. 3E, the downlink signal DSc includes given data including the local identifier LID assigned to the active pen 2. It should be noted that, since the downlink signal DSc is transmitted via short-range wireless communication, various kinds of information corresponding to the low order of the protocol stack such as the destination address and the source address of the short-range wireless communication are added to the actual downlink signal DSc, but the description of these pieces of information is omitted in FIG. 3E, and only the information corresponding to the high order of the protocol stack is illustrated.

As illustrated in FIG. 3E, the downlink signal DSc can include the pen pressure value PRE, the switch information SW, and the error detection code CRC similarly to the downlink signal DSa illustrated in FIG. 3C. Accordingly, the downlink signal DSc serves as alternative transmission means in a case where the active pen 2 is not synchronized with the sensor controller 31 and therefore these pieces of information cannot be transmitted via the pen-tip communication.

The sensor controller 31 is configured to output the positions detected by the downlink signals DSa and DSb and the data received by the downlink signals DSa and DSc to the host processor as data from the same active pen 2. More specifically, the sensor controller 31 generates a data stream to supply data to the host processor 34 for each local identifier LID, and is configured to sequentially synthesize, into the data stream, the positions detected by the downlink signals DSa and DSb and the data received by the downlink signals DSa and DSc. Accordingly, the host processor 34 can process even the data received by the sensor controller 31 via the short-range wireless communication, in the same manner as the data received via the pen-tip communication.

Here, since the downlink signals DSa and DSb are transmitted according to the transmission/reception schedule, the sensor controller 31 can acquire the local identifier LID indicating the sources of the downlink signals DSa and DSb on the basis of the reception timings of the downlink signals DSa and DSb. Therefore, the sensor controller 31 can synthesize, into the corresponding data stream, the position and transmission data of the active pen 2 acquired from the downlink signals DSa and DSb, even if the local identifier LID is not arranged in the downlink signals DSa and DSb.

On the other hand, since the downlink signal DSc is transmitted regardless of the transmission/reception schedule, the sensor controller 31 cannot acquire the local identifier LID indicating the source of the downlink signal DSc, even by referring to the reception timing of the downlink signal DSc. If the source address of the short-range wireless communication and the local identifier LID are stored in association with each other and the source address included in the downlink signal DSc is referred to, it is possible in principle to acquire the local identifier LID indicating the source of the downlink signal DSc, but for this purpose, the sensor controller 31 needs to refer to information corresponding to the low order of the protocol stack of the short-range wireless communication.

Therefore, by arranging the local identifier LID in the downlink signal DSc in the present embodiment, the sensor controller 31 can determine the local identifier LID indicating the source of the downlink signal DSc, from only the information corresponding to the high order of the protocol stack of the short-range wireless communication. In this way, the sensor controller 31 can synthesize, into the corresponding data stream, the transmission data of the active pen 2 acquired from the downlink signal DSc, even if the sensor controller 31 does not refer to the information corresponding to the low order of the protocol stack of the short-range wireless communication.

Hereinafter, the processes described so far will be described in more detail with reference to a processing flow diagram for illustrating the processes of the processing circuit 26d and the sensor controller 31.

Figure 5:
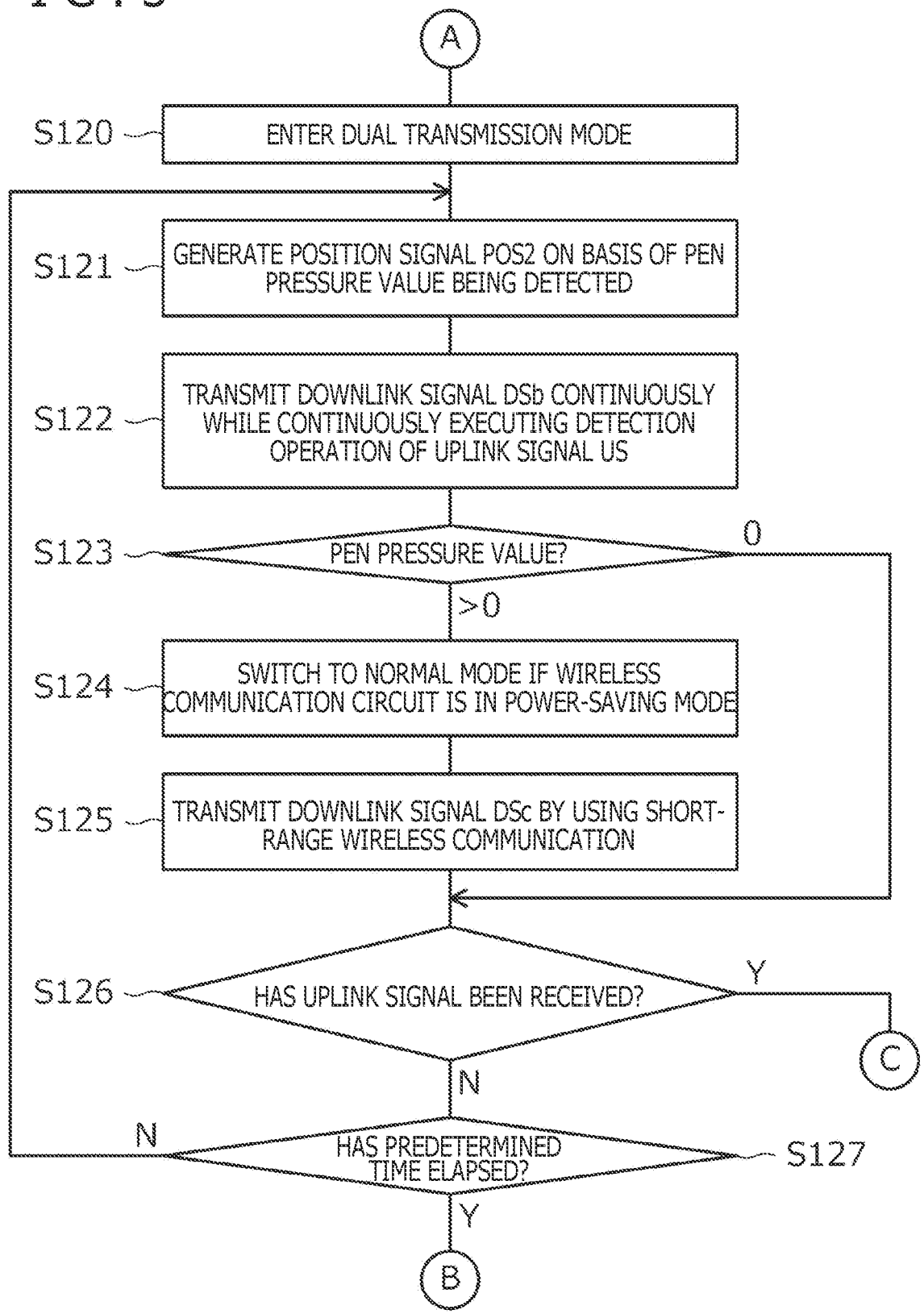
FIG. 5 is a processing flow diagram for illustrating a process performed by the processing circuit 26d of the active pen 2.

First, FIG. 4 and FIG. 5 are processing flow diagrams for illustrating the process performed by the processing circuit 26d of the active pen 2. As illustrated in FIG. 4, the processing circuit 26d first enters the discovery mode (Step S100). Then, the reception circuit 26c is caused to execute the detection operation of the uplink signal US (Step S101), and as a result, it is determined whether or not the uplink signal US has been received (Step S102). The processing circuit 26d which determines that the uplink signal US has not been received repeats the process from Step S101. On the other hand, the processing circuit 26d which determines that the uplink signal US has been received enters the normal mode (Step S103). Then, by extracting the local identifier NLID from the uplink signal US and storing it, pairing of the pen-tip communication with the sensor controller 31 is performed (Step S104).

Next, the processing circuit 26d acquires the short-range wireless communication address of the sensor controller 31 (Step S105). This address is specifically the address of the wireless communication circuit 33 illustrated in FIG. 1, and is set in advance in the processing circuit 26d by user operation. Subsequently, the processing circuit 26d determines whether or not the pairing of the short-range wireless communication with the apparatus indicated by the acquired address has been established, and, if not, executes the paring of the short-range wireless communication with the apparatus by using the wireless communication circuit 28 illustrated in FIG. 1 (Step S106).

Next, the processing circuit 26d decides, by using the reception timing of the last received uplink signal US as the reference time, the transmission/reception schedule of the downlink signal DS and a next uplink signal US (Step S107), and performs the transmission of the downlink signal DSa according to the decided transmission/reception schedule (Step S108) and the detection operation of the next uplink signal US (Step S109). Then, it is determined whether or not the uplink signal US has been received as a result of Step S109 (Step S110), and in a case where it is determined that it has been received, the processing circuit 26d repeats the process from Step S107, while, in a case where it is determined that it has not been received, the processing circuit 26d enters the dual transmission mode (Step S120).

The processing circuit 26d which has entered the dual transmission mode generates the position signal POS2 illustrated in FIG. 3D, on the basis of the pen pressure value being detected (the latest pen pressure value supplied from the pressure sensor 23) (Step S121). That is, the position signal POS2 is generated by modulating the carrier signal on the basis of whether or not the active pen 2 is in contact with the touch surface 3a. Then, the processing circuit 26d continuously transmits the downlink signal DSb while continuously executing the detection operation of the uplink signal US (Step S122). This simultaneous reception and transmission is a process that can be realized by the stop filter 27 illustrated in FIG. 1 as described above.

In addition, the processing circuit 26d determines whether the pen pressure value being detected is 0 or a value larger than 0 (Step S123), and in a case where it is determined to be a value larger than 0, a process of transmitting the downlink signal DSc is performed. Specifically, first, if the wireless communication circuit 28 is in the power-saving mode, the wireless communication circuit 28 is switched to the normal mode (Step S124), and then the downlink signal DSc is transmitted with use of the short-range wireless communication (Step S125). If the wireless communication circuit 28 is not used for a while, the wireless communication circuit 28 enters the power-saving mode and cannot communicate, and in such a case, Step S124 is a process to enable the wireless communication circuit 28 to communicable again. In addition, the reason why the downlink signal DSc is not transmitted in a case where the pen pressure value being detected is 0 is to suppress the power consumption caused by the wireless communication circuit 28 because no digital ink is generated in the case where the pen pressure value being detected is 0 and there is little need to immediately send the pen pressure value or the switch information.

Next, the processing circuit 26d determines whether or not the uplink signal US has been received by the detection operation executed in Step S122 (Step S126). As a result, the processing circuit 26d which determines that the uplink signal US has been received transitions to Step S103 of FIG. 4, and returns to the normal mode to continue the process. On the other hand, the processing circuit 26d which determines in Step S126 that the uplink signal US has not been received determines whether or not a predetermined time has elapsed from the last reception of the uplink signal US (Step S127). Then, in a case where it is determined that the predetermined time has not elapsed, the processing circuit 26d returns to Step S121 to repeat the process of the dual transmission mode, while, in a case where it is determined that the predetermined time has elapsed, the processing circuit 26d returns to Step S100 to enter the discovery mode. Accordingly, it is possible to prevent the downlink signals DSb and DSc from being continuously transmitted even though the active pen 2 has been separated from the electronic apparatus 3.

Figure 6:
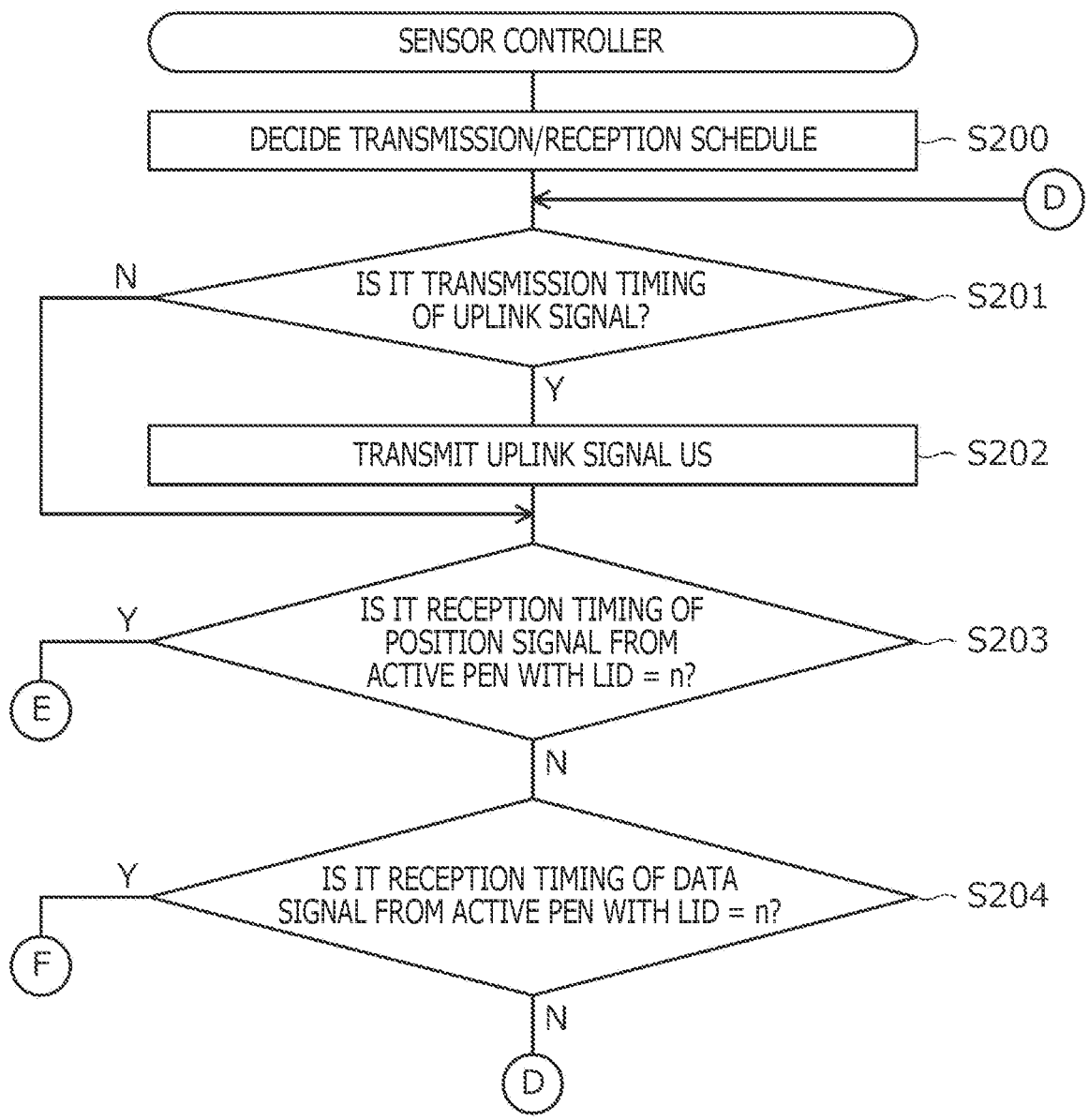
FIG. 6 is a processing flow diagram for illustrating a process performed by a sensor controller 31.

Next, FIG. 6 to FIG. 9 are processing flow diagrams for illustrating the process performed by the sensor controller 31. As illustrated in FIG. 6, the sensor controller 31 first decides the transmission/reception schedule of the uplink signal US and the downlink signal DS (Step S200). The transmission/reception schedule decided here includes the transmission period of the uplink signal US and the reception timing (the timing set by using the transmission timing of the uplink signal US as the reference time) of the downlink signal DS for each local identifier LID. The transmission/reception schedule is set in advance in the protocol of an active capacitive method, and is shared in advance between the sensor controller 31 and the active pen 2.

Here, a plurality of transmission/reception schedules that differ depending on conditions such as the number of active pens 2 being detected may be prepared in advance, and the sensor controller 31 may change the transmission/reception schedule in a case where the conditions are satisfied. Then, each time a change is made, the command COM in the uplink signal US may be used to notify each active pen 2 of information indicating the transmission/reception schedule to be used. In this way, it is possible to effectively utilize the communication resources of the active capacitive method. In addition, in a case where the electronic apparatus 3 is of the in-cell type described above, the sensor controller 31 may decide the transmission/reception schedule on the basis of information regarding the driving period of the pixels of the display 32 acquired from the host processor 34 illustrated in FIG. 1. In this way, it is possible to avoid a failure in transmitting and receiving signals due to noise generated from the display 32.

Next, the sensor controller 31 determines whether or not the transmission timing of the uplink signal US indicated in the decided transmission/reception schedule has arrived (Step S201), and in a case where it is determined that it has arrived, the uplink signal US is transmitted (Step S202). On the other hand, the sensor controller 31 which determines that it has not arrived determines whether or not the reception timings of the position signal POS1 and the data signal DATA have arrived for each local identifier LID (Steps S203 and S204). In a case where it is determined that either timing has not arrived, the sensor controller 31 returns to Step S201 to repeat the process. On the other hand, in a case where it is determined that the reception timing of the position signal POS1 has arrived, the process is shifted to Step S210 illustrated in FIG. 7, and in a case where it is determined that the reception timing of the data signal DATA has arrived, the process is shifted to Step S220 illustrated in FIG. 8. Hereinafter, the process illustrated in FIG. 7 to FIG. 9 will be described with use of a case where the local identifier LID is equal to n as an example.

Figure 7:
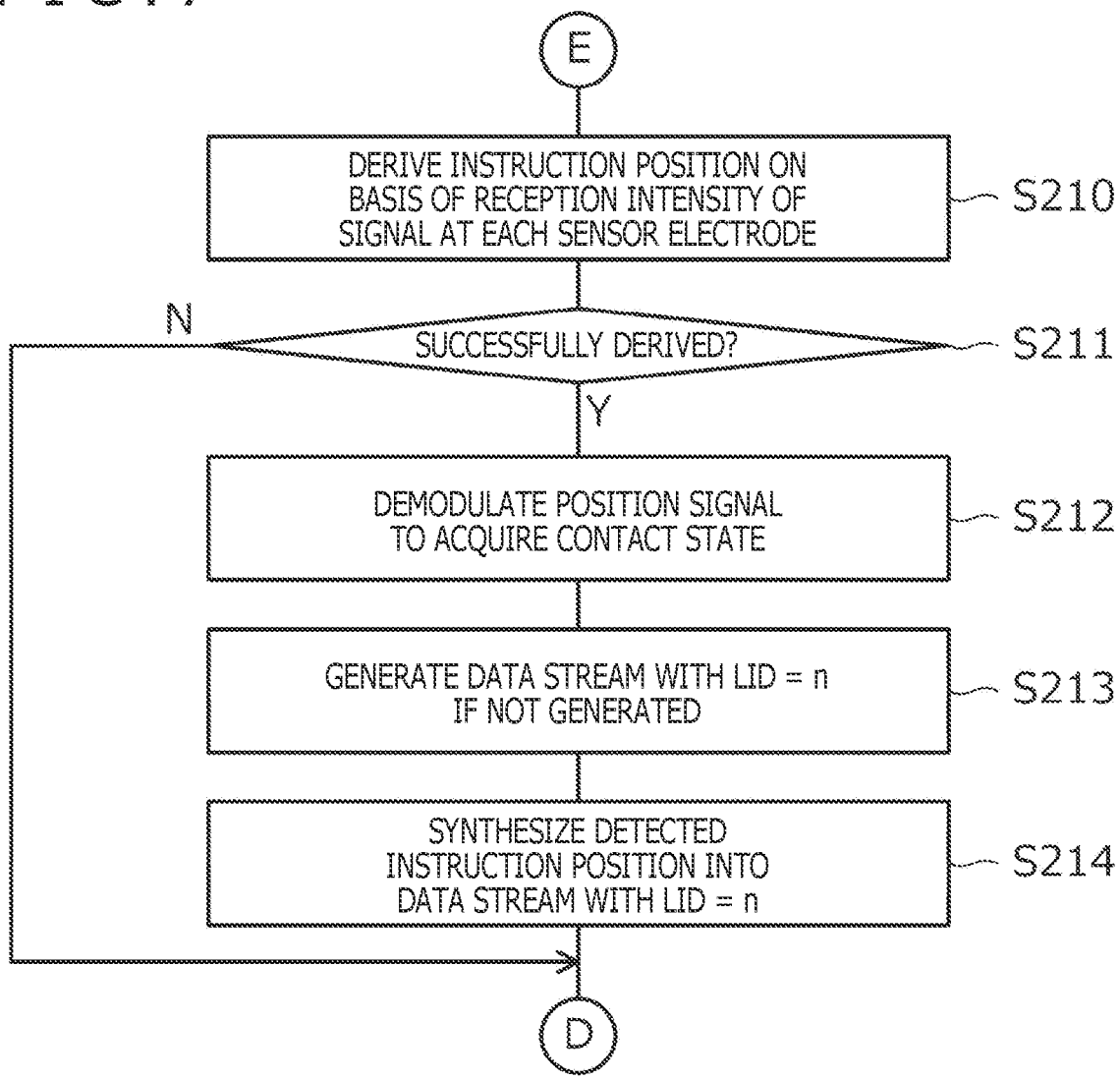
FIG. 7 is a processing flow diagram for illustrating a process performed by the sensor controller 31.

In Step S210 of FIG. 7, the sensor controller 31 derives the instruction position of the active pen 2 on the basis of the reception intensity of the signal at each of the plurality of sensor electrodes configuring the sensor 30 illustrated in FIG. 1 (Step S210). Then, it is determined whether or not the instruction position of the active pen 2 has successfully been derived (Step S211), and in a case where it is determined that it has not been able to be derived, the process is returned to Step S201 of FIG. 6. On the other hand, in a case where it is determined in Step S211 that it has successfully been derived, the sensor controller 31 performs a demodulation process by regarding the received signal as the position signal POS2, and attempts to acquire the information transmitted by the processing circuit 26d of the active pen 2 (Step S212). Here, assuming that the information acquired in Step S213 is information indicating the contact state (the state of contact with the touch surface 3a) of the active pen 2, the sensor controller 31 refers to this information in Step S230 which will be described later and which is executed in a case where the data signal DATA has not been able to be received. In a case where the received signal is the position signal POS1 or any other signal, the information acquired in Step S213 is not significant information, but there is no particular problem because the sensor controller 31 in this case does not execute Step S230 to be described later.

Then, the sensor controller 31 generates a data stream with LID=n if it has not been generated (Step S214), and synthesizes the detected instruction position into the data stream with LID=n (Step S215). Accordingly, the instruction position of the active pen 2 corresponding to LID=n is supplied to the host processor 34.

Figure 8:
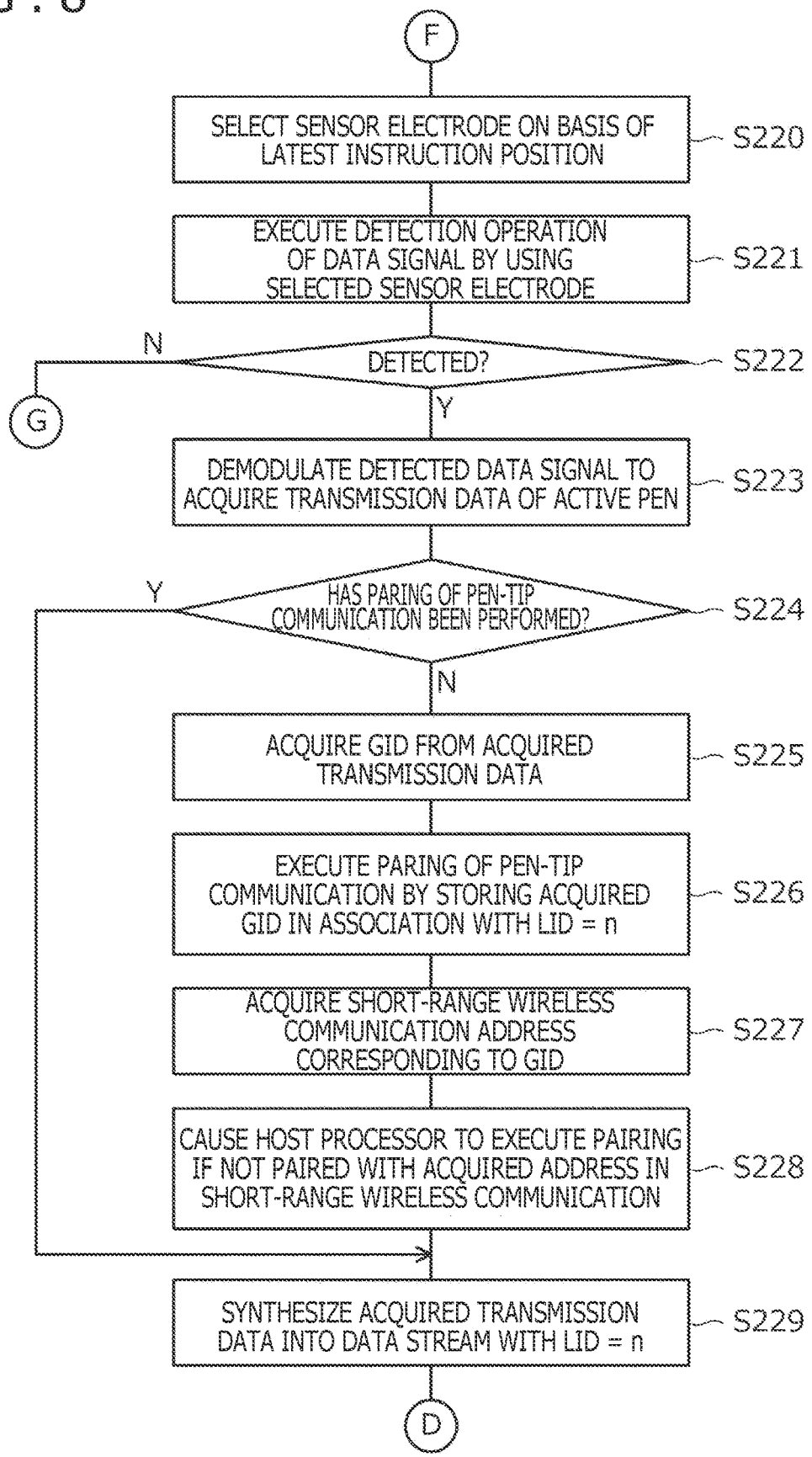
FIG. 8 is a processing flow diagram for illustrating a process performed by the sensor controller 31.

In Step S220 of FIG. 8, the sensor controller 31 selects one sensor electrode on the basis of the latest instruction position of the corresponding active pen 2 (Step S220), and executes the detection operation of the data signal DATA by using the selected sensor electrode (Step S221). Then, it is determined whether or not the data signal DATA has been detected (Step S222).

The sensor controller 31 which determines in Step S222 that the data signal DATA has been detected acquires the transmission data of the active pen 2 by demodulating the detected data signal DATA (Step S223). Subsequently, the sensor controller 31 determines whether or not paring of the pen-tip communication with the active pen 2 with LID=n has been established (Step S224). Then, if it has not been established, the global identifier GID is acquired from the data acquired in Step S223 (Step S225), and paring of the pen-tip communication with the active pen 2 is performed by storing the acquired global identifier GID in association with LID=n (Step S226).

The sensor controller 31 further acquires the short-range wireless communication address corresponding to the global identifier GID (Step S227). The address is specifically the address of the wireless communication circuit 28 illustrated in FIG. 1, and is set in advance in the sensor controller 31 by user operation in association with the global identifier GID of the active pen 2. Subsequently, the sensor controller 31 determines whether or not pairing of the short-range wireless communication with the apparatus indicated by the acquired address has been established, and, if not, instructs the host processor 34 to execute the pairing (Step S228). The host processor 34 which has received the instruction executes the pairing of the short-range wireless communication with the address acquired by the sensor controller 31 in Step S227, by using the wireless communication circuit 33 illustrated in FIG. 1.

In a case where it is determined in Step S224 that the pairing has been established, or in a case where Step S228 has been terminated, the sensor controller 31 synthesizes the data acquired in Step S223 into the data stream with LID=n (Step S229), and returns the process to Step S201 of FIG. 6. When the sensor controller 31 executes Step S229, the transmission data of the active pen 2 corresponding to LID=n is supplied to the host processor 34.

Figure 9:
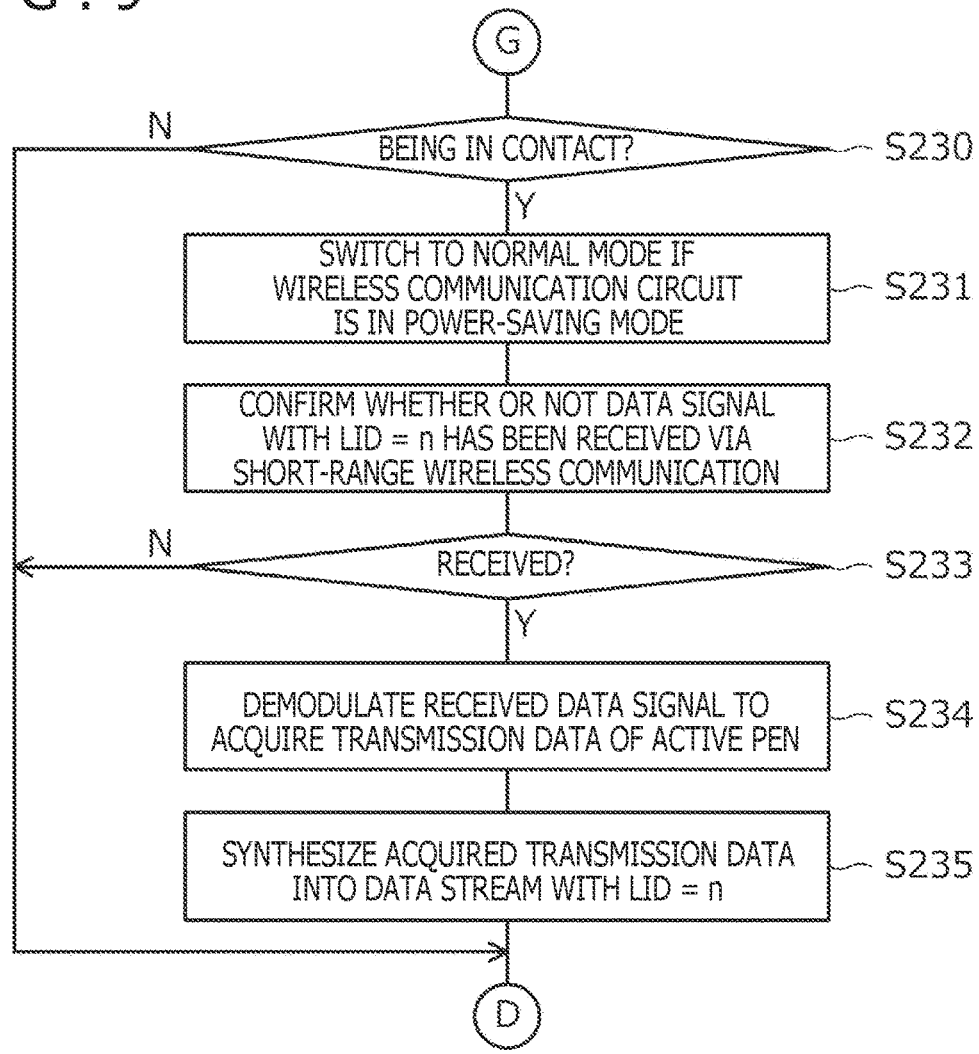
FIG. 9 is a processing flow diagram for illustrating a process performed by the sensor controller 31.

The sensor controller 31 which determines in Step S222 of FIG. 8 that the data signal DATA has not been detected determines whether or not the active pen 2 is in contact, as illustrated in FIG. 9 (Step S230). The determination is executed on the basis of the information acquired by the sensor controller 31 in Step S212 of FIG. 7.

If the wireless communication circuit 33 is in the power-saving mode, the sensor controller 31 which determines in Step S230 that the active pen 2 is in contact switches the mode to the normal mode (Step S231), confirms whether or not the data signal (downlink signal DSc) with LID=n has been received via short-range wireless communication (Step S232), and determines the result (Step S233). It should be noted that Step S231 is required for the reason similar to Step S124 illustrated in FIG. 5.

The sensor controller 31 which determines in Step S233 that the data signal with LID=n has been received acquires the transmission data of the active pen 2 corresponding to LID=n by demodulating the received data signal (Step S234). Then, the acquired transmission data is synthesized into the data stream with LID=n (Step S235), and the process is returned to Step S201 of FIG. 6. When the sensor controller 31 executes Step S235, the host processor 34 can continuously acquire the data transmitted by the active pen 2, even if the active pen 2 cannot transmit the data signal DATA from the pen-tip electrode 21 due to a failure in receiving the uplink signal US, and can continuously acquire even the position of the active pen 2 through Step S215, so that the drawing by pen input can be continued.

As described above, according to the active pen 2 and the position detection system 1 according to the present embodiment, even if the uplink signal US is not received and the active pen 2 cannot transmit the data signal DATA from the pen-tip electrode 21, the sensor controller 31 can detect the position of the active pen 2 by using the position signal POS2 transmitted from the pen-tip electrode 21, and can receive the transmission data of the active pen 2 via the short-range wireless communication. Therefore, it is possible to prevent the drawing by pen input from stopping due to a failure in receiving the uplink signal US.

In addition, since the contact state information indicating whether or not the active pen 2 is in contact with the touch surface 3a can be transmitted via the position signal POS2, it is possible to cancel the use of the short-range wireless communication in a case where the drawing by pen input is not being performed, thereby making it possible to reduce the power consumption of the active pen 2. In addition, it is also possible to obtain the effect that the occurrence of a delay in updating the contact state information by the sensor controller 31 can be suppressed.

In addition, since the stop filter 27 is provided in the active pen 2 and the detection operation of the uplink signal US can be performed in parallel with the transmission of the position signal POS2, it is possible to return the active pen 2 from the dual transmission mode to the normal mode while continuously transmitting the position signal POS2.

Next, a second embodiment of the present disclosure will be described in detail. In the present embodiment, the operation of the position detection system 1 also described in the first embodiment will be described in more detail by focusing on the point of suppressing the occurrence of a delay in updating the contact state information by the sensor controller 31.

Figure 10:
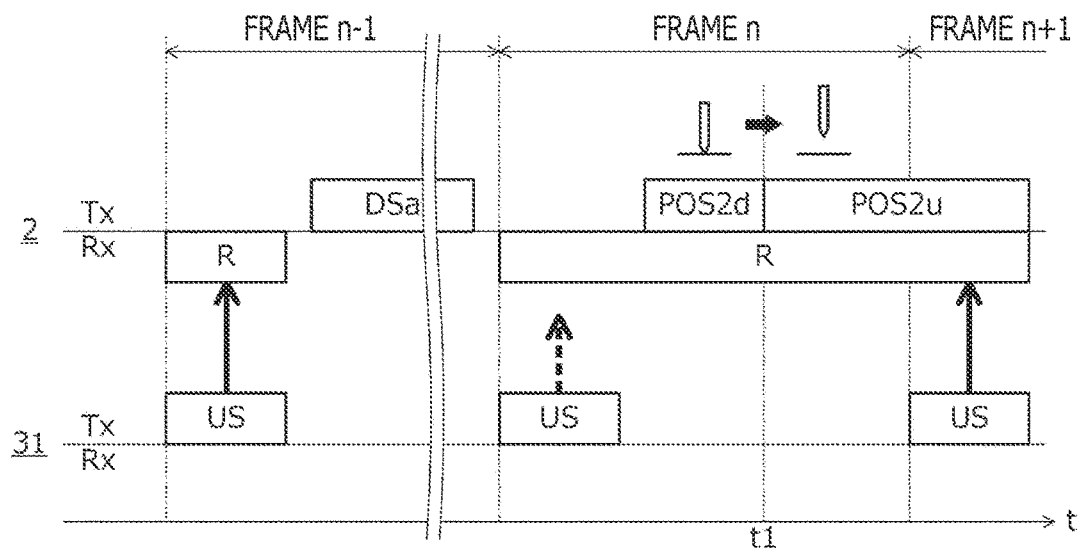
FIG. 10 is a diagram for illustrating signals transmitted and received between the active pen 2 and the sensor controller 31 that configure a position detection system 1 of a second embodiment of the present disclosure.

FIG. 10 is a diagram for illustrating signals transmitted and received between the active pen 2 and the sensor controller 31 that configure the position detection system 1 of the present embodiment. The horizontal axis in FIG. 10 is the time axis. In addition, each "frame" illustrated in FIG. 10 is the transmission period of the uplink signal US, and the sensor controller 31 is configured to transmit the uplink signal US at the beginning of each frame. These points are similar in FIG. 11 to FIG. 14 to be described later.

A position signal POS2$d$ illustrated in FIG. 10 is the position signal POS2 transmitted by the active pen 2 in a case of being in the contact state, and a position signal POS2$u$ is the position signal POS2 transmitted by the active pen 2 in a case of being in the hovering state. The processing circuit 26$d$ according to the present embodiment is configured to be able to generate at least two kinds of carrier signals with different frequencies by controlling the frequency division ratio of the frequency division circuit described above, and is configured to generate the position signal POS2$d$ on the basis of one (first carrier signal) of the carrier signals and generate the position signal POS2$u$ on the basis of the other (second carrier signal) of the carrier signals. More specifically, the processing circuit 26$d$ is configured to acquire an unmodulated first carrier signal as the position signal POS2$d$ and acquire an unmodulated second carrier signal as the position signal POS2$u$.

The reception circuit 26$c$ of the active pen 2 according to the example of FIG. 10 has successfully received the uplink signal US transmitted by the sensor controller 31 in the n−1-th frame. In this case, the downlink signal DS transmitted by the processing circuit 26$d$ becomes the downlink signal DSa illustrated in FIG. 3B or FIG. 3C, as illustrated in FIG. 10. The processing circuit 26$d$ transmits the downlink signal DSa by using the remaining time after receiving the uplink signal US, and waits for the uplink signal US to be received at the beginning of the n-th frame.

Then, the reception circuit 26$c$ of the active pen 2 according to the example of FIG. 10 fails to receive the uplink signal US transmitted by the sensor controller 31 in the n-th frame. The processing circuit 26$d$ in this case enters the dual transmission mode as illustrated in FIG. 4 to transmit the downlink signal DSb that is the position signal POS2, and performs, at this time, a process of modulating the carrier signal on the basis of the latest contact state information acquired (hereinafter, referred to as a "carrier modulation process"). Specifically, while the position signal POS2$d$ is generated in the case of being in the contact state, the position signal POS2$d$ is generated in the case of being in the hovering state, and the generated signal is transmitted as the downlink signal DSb.

In the example of FIG. 10, the contact state information of the active pen 2 is switched from the contact state to the hovering state at time t1, and in response to this, the processing circuit 26d transmits the position signal POS2d until time t1 and transmits the position signal POS2u after time t1. The transmission of the position signal POS2d or the position signal POS2u is executed until the uplink signal US is received or until a predetermined time elapses from the last reception of the uplink signal US, as described with reference to FIG. 4.

The sensor controller 31 is configured to sequentially determine whether the carrier signal of the downlink signal DSb received from the active pen 2 is the first carrier signal or the second carrier signal, and to determine whether or not the active pen 2 is in contact with the touch surface 3a, on the basis of the result of the determination. Accordingly, the sensor controller 31 can update the contact state information of the active pen 2 without waiting for the pen pressure value PRE to be received via the pen-tip communication or short-range wireless communication.

Here, in order to enable the sensor controller 31 to receive both the first carrier signal and the second carrier signal, each of a detection circuit in which the frequency of the reference signal is equal to the frequency of the first carrier signal and a detection circuit in which the frequency of the reference signal is equal to the frequency of the second carrier signal is arranged in the sensor controller 31 in principle. However, in a case where the frequency difference between the first carrier signal and the second carrier signal is sufficiently small as in a case where, for example, the first carrier signal is the 400 kHz signal described above and the second carrier signal is the 381 kHz or 421 kHz signal described above, the sensor controller 31 can also be configured to receive both the first carrier signal and the second carrier signal by a single detection circuit. That is, a detection circuit in which the frequency of the reference signal is, for example, 400 kHz can detect the 381 kHz or 421 kHz signal, but in this case, the phase output from the detection circuit gradually changes. The sensor controller 31 only needs to determine whether the carrier signal of the received downlink signal DSb is the first carrier signal or the second carrier signal according to the change in phase.

As described above, according to the active pen 2 and the position detection system 1 according to the present embodiment, since the contact state information can be transmitted by frequency modulation of the carrier signal of the downlink signal DSb, it is possible to suppress the occurrence of a delay in updating the contact state information by the sensor controller 31. Then, if the sensor controller 31 is configured to sequentially supply the contact state information thus updated to the host processor 33, in a case where, for example, the drawing application being operated by the host processor 34 can execute a drawing operation without the pen pressure value PRE, it is possible to cause the drawing application to start the drawing of strokes without waiting for the supply of the pen pressure value PRE.

Figure 11:
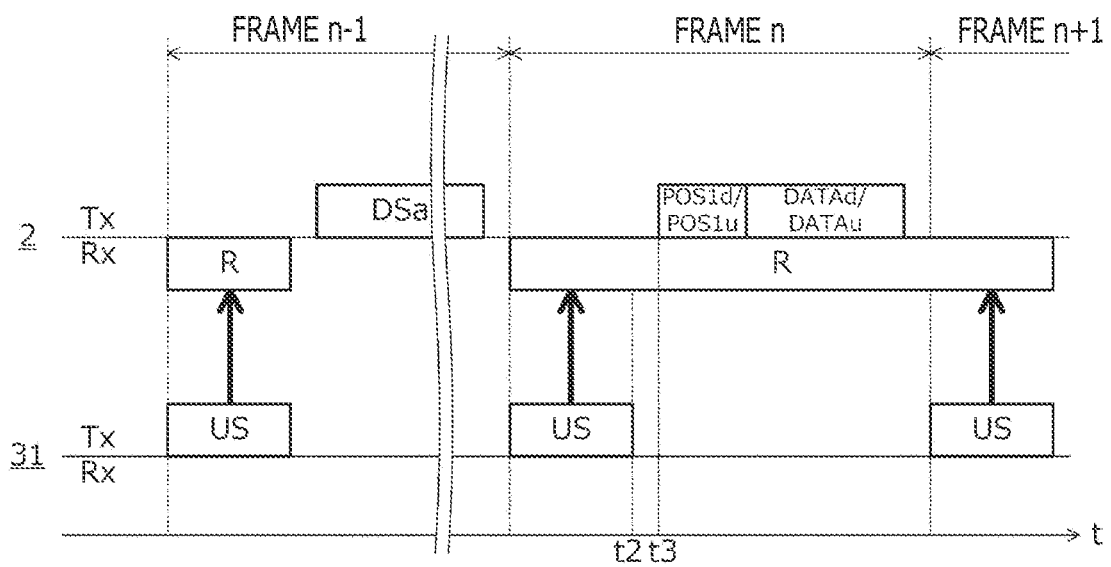
FIG. 11 is a diagram for illustrating signals transmitted and received between the active pen 2 and the sensor controller 31 that configure a position detection system 1 according to a modified example of the second embodiment of the present disclosure.

FIG. 11 is a diagram for illustrating signals transmitted and received between the active pen 2 and the sensor controller 31 that configure a position detection system 1 according to a modified example of the present embodiment. The position detection system 1 according to the present modified example differs from the position detection system 1 according to the present embodiment in that the contact state information is transmitted separately from the pen pressure value PRE in the data signal DATA by using the downlink signal DSa instead of the downlink signal DSb. The following is the description focusing on the differences.

A position signal POS1d illustrated in FIG. 11 is the position signal POS1 transmitted by the active pen 2 in a case of being in the contact state, and a position signal POS1u is the position signal POS1 transmitted by the active pen 2 in a case of being in the hovering state. In addition, data signal DATAd illustrated in FIG. 11 is the data signal DATA transmitted by the active pen 2 in a case of being in the contact state, and data signal DATAu is the data signal DATA transmitted by the active pen 2 in a case of being in the hovering state.

The processing circuit 26d according to the present modified example is configured to generate the position signal POS1d and the data signal DATAd on the basis of the first carrier signal described above and generate the position signal POS1u and the data signal DATAu on the basis of the second carrier signal described above. More specifically, the processing circuit 26d is configured to acquire an unmodulated first carrier signal as the position signal POS1d and acquire an unmodulated second carrier signal as the position signal POS1u. In addition, the processing circuit 26d is configured to acquire, as the data signal DATAd, the first carrier signal modulated by data transmitted to the sensor controller 31 and acquire, as the data signal DATAu, the second carrier signal modulated by data transmitted to the sensor controller 31.

The processing circuit 26d of the active pen 2 according to the present modified example is configured to start the carrier modulation process described above at a timing (time t3) decided by a predetermined communication protocol by using, as the reference, the reception timing (time t2) of the uplink signal US received by the reception circuit 26c and to continuously execute the carrier modulation process over a period decided by the predetermined communication protocol.

FIG. 11 illustrates an example in which time t3 is equal to the transmission start timing of the position signal POS1 and the carrier modulation process is executed until the transmission end of the data signal DATA. In this case, the signals generated by the processing circuit 26d in the carrier modulation process are any one or more of the position signals POS1d and POS1u and any one or more of the data signals DATAd and DATAu. However, the timing at which the processing circuit 26d starts the carrier modulation process and the period during which the carrier modulation process continues are not limited to this example. For example, the carrier modulation process may start at the same time as the transmission of the position signal POS1, and the carrier modulation process may continue until the transmission end of the position signal POS1. In this case, the signal generated by the processing circuit 26d in the carrier modulation process is any one or more of the position signals POS1d and POS1u. In addition, for example, the carrier modulation process may start at the same time as the transmission of the data signal DATA, and the carrier modulation process may continue until the transmission end of the data signal DATA. In this case, the signal generated by the processing circuit 26d in the carrier modulation process is any one or more of the data signals DATAd and DATAu. In addition, the carrier modulation process may start or end at the timing at which the position signal POS1 is being transmitted or the timing at which the data signal DATA is being transmitted.

The sensor controller 31 according to the present modified example starts the process of determining whether the carrier signal of the downlink signal DSa received from the active pen 2 is either the first carrier signal or the second carrier signal, at the timing decided by the predetermined communication protocol by using the transmission end timing of the uplink signal US as the reference, and sequentially executes the determination process continuously over the period decided by the predetermined communication protocol. The sensor controller 31 is configured to then sequentially determine whether or not the active pen 2 is in contact with the touch surface 3*a*, on the basis of the result of the determination. Accordingly, the sensor controller 31 can update the contact state information of the active pen 2 without waiting for the pen pressure value PRE to be received via the pen-tip communication or short-range wireless communication.

As described above, according to the active pen 2 and the position detection system 1 according to the present modified example, the contact state information can be transmitted separately from the pen pressure value PRE in the data signal DATA by frequency modulation of the carrier signal of the downlink signal DSa. It should be noted that it is obvious that the transmission of the contact state information according to the present modified example (the transmission of the contact state information via the downlink signal DSa) may be used together with the transmission of the contact state information according to the present embodiment (the transmission of the contact state information via the downlink signal DSb).

Next, a third embodiment of the present disclosure will be described in detail. A position detection system 1 according to the present embodiment differs from the position detection system 1 according to the second embodiment in that the contact state information is transmitted with use of a plurality of carrier signals with different phases instead of frequencies. The following is the detailed description focusing on the differences.

Figure 12:
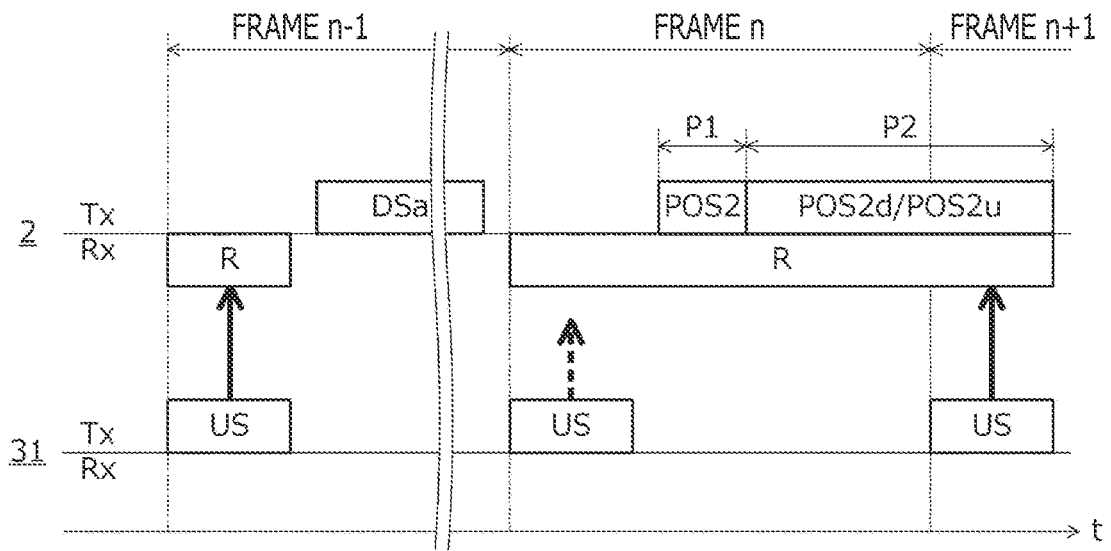
FIG. 12 is a diagram for illustrating signals transmitted and received between the active pen 2 and the sensor controller 31 that configure a position detection system 1 of a third embodiment of the present disclosure.

FIG. 12 is a diagram for illustrating signals transmitted and received between the active pen 2 and the sensor controller 31 that configure the position detection system 1 of the present embodiment. The processing circuit 26*d* which has failed to receive the uplink signal US in the n-th frame and has entered the dual transmission mode performs processes different between a first period P1 illustrated and a second period P2, which is the period after the first period P1. Specifically, in the first period P1, the processing circuit 26*d* first generates the position signal POS2 on the basis of the carrier signal with a predetermined phase. The position signal POS2 is nothing less than the position signal POS2 generated in a case where the carrier modulation process described above is not performed. On the other hand, in the second period P2, the processing circuit 26*d* generates any one of the position signals POS2*d* and POS2*u* by performing the carrier modulation process described above. The time length of the first period P1 is set in advance by a predetermined communication protocol.

The carrier signal (first carrier signal) configuring the position signal POS2*d* in the present embodiment is a signal whose phase difference from a carrier signal (third carrier signal) configuring the position signal POS2 is a first value. On the other hand, the carrier signal (second carrier signal) configuring the position signal POS2*u* in the present embodiment is a signal whose phase difference from the carrier signal (third carrier signal) configuring the position signal POS2 is a second value different from the first value. In a typical example, the first value is 0 degrees and the second value is 90 degrees or 180 degrees, but the first value may be 90 degrees or 180 degrees and the second value may be 0 degrees. In addition, both the first value and the second value may be values other than 0 degrees. It should be noted that, in consideration of a case where a signal whose phase is different by 180 degrees from that of the signal transmitted from the pen-tip electrode 21 may be transmitted from the hand of the user holding the active pen 2, it is more preferable to set the first value or the second value to 90 degrees instead of 180 degrees. However, in a case where the signal transmitted from the hand of the user can be excluded by a predetermined palm rejection process executed on the basis of the reception area of signals or the like, the first value or the second value may be 180 degrees.

The processing circuit 26*d* determines the state of the active pen 2 on the basis of the latest contact state information acquired. The processing circuit 26*d* generates the position signal POS2*d* in a case where the active pen 2 is in the contact state, while generating the position signal POS2*d* in a case where the active pen 2 is in the hovering state, and transmits the generated signal as the downlink signal DSb. The transmission of the position signal POS2*d* or the position signal POS2*u* is executed until the uplink signal US is received or until a predetermined time elapses from the last reception of the uplink signal US, which is similar to the second embodiment.

The sensor controller 31 according to the present embodiment is configured to detect the phase of the carrier signal of the received downlink signal DSb at each of a predetermined first timing after the transmission of the uplink signal US and a second timing after the first timing. The first timing is a timing within the first period P1, and the second timing is a timing within the second period P2. The sensor controller 31 measures the time elapsed from the start of the reception of the downlink signal DSb and acquires, as the first period P1, the period until the time length set by a predetermined communication protocol elapses, while acquiring, as the second period P2, the period after the first period P1 ends, to set the first timing and the second timing on the basis of each acquired period.

The sensor controller 31 which has detected the phase of the carrier signal of the downlink signal DSb at each of the first timing and the second timing determines whether or not the active pen 2 is in contact with the touch surface 3*a*, on the basis of the detected phase difference. That is, when the detected phase difference is the above first value, it is determined as the contact state, and when the detected phase difference is the above second value, it is determined as the hovering state. Accordingly, the sensor controller 31 can update the contact state information of the active pen 2 without waiting for the pen pressure value PRE to be received via the pen-tip communication or short-range wireless communication.

Here, it is preferable that the sensor controller 31 set a plurality of second timings and make the above determination at every second timing. In this way, the sensor controller 31 can more frequently determine whether or not the active pen 2 is in contact with the touch surface 3*a*.

As described above, according to the active pen 2 and the position detection system 1 according to the present embodiment, since the contact state information can be transmitted by phase modulation of the carrier signal of the downlink signal DSb, it is possible to suppress the occurrence of a delay in updating the contact state information by the sensor controller 31, as in the second embodiment.

FIG. 13 is a diagram for illustrating signals transmitted and received between the active pen 2 and the sensor controller 31 that configure a position detection system 1 according to a modified example of the present embodiment. The position detection system 1 according to the present modified example differs from the position detection system 1 according to the present embodiment in that the contact state information is transmitted separately from the pen pressure value PRE in the data signal DATA by using the downlink signal DSa instead of the downlink signal DSb. The following is the description focusing on the differences.

The processing circuit 26d according to the present modified example is configured to decide the start timings (times t5 and t6) of the first period P1 and the second period P2, respectively, at the timing decided by a predetermined communication protocol using, as the reference, the reception timing (time t4) of the uplink signal US received by the reception circuit 26c.

FIG. 13 illustrates an example in which time t5 is equal to the transmission start timing of the position signal POS1 and time t6 is equal to the transmission start timing of the data signal DATA. The processing circuit 26d in this case generates the position signal POS1 on the basis of the third carrier signal, while generating, for the data signal DATA, the data signal DATAd on the basis of the first carrier signal in a case of being in the contact state and generating the data signal DATAu on the basis of the second carrier signal in a case of being in the hovering state. However, the start timing of each of the first period P1 and the second period P2 decided by the processing circuit 26d is not limited to this example. For example, the start timing of the second period P2 may be set to a timing at which the position signal POS1 or the data signal DATA is being transmitted.

The sensor controller 31 according to the present modified example decides the start timing of each of the first period P1 and the second period P2 at the timing decided by the predetermined communication protocol by using the transmission end timing of the uplink signal US as the reference. The subsequent process is similar to that performed by the sensor controller 31 according to the present embodiment.

As described above, according to the active pen 2 and the position detection system 1 according to the present modified example, the contact state information can be transmitted separately from the pen pressure value PRE in the data signal DATA by phase modulation of the carrier signal of the downlink signal DSa. It should be noted that it is obvious that the transmission of the contact state information according to the present modified example (the transmission of the contact state information via the downlink signal DSa) may be used together with the transmission of the contact state information according to the present embodiment (the transmission of the contact state information via the downlink signal DSb).

Although the preferred embodiments of the present disclosure have been described above, it is obvious that the present disclosure is not limited to such embodiments at all, and can be carried out in various forms without departing from the gist thereof.

For example, the example in which the transmission of the uplink signal US from the sensor controller 31 is performed by the capacitive coupling method has been described in each of the above embodiments, but the uplink signal US may be transmitted by an electromagnetic induction method. The active pen 2 in this case is preferably provided with a coil for receiving the uplink signal US, instead of the ring electrode 22 and the stop filter 27.

In addition, the example in which the local identifier LID, the pen pressure value PRE, the switch information SW, and the error detection code CRC are transmitted by the downlink signal DSc has been described in each of the above embodiments, but the downlink signal DSc only needs to be a signal used to transmit at least a part of the data signal transmitted by the active pen 2 to the sensor controller 31, and some of these pieces of information need not be transmitted, or information other than these may be transmitted.

In addition, the example in which the ring electrode 22 is used to detect the uplink signal US has been described in each of the above embodiments, but the downlink signal DS may also be transmitted from the ring electrode 22. In one example, the downlink signal DSa may be transmitted from the pen-tip electrode 21 and the downlink signal DSb may be transmitted from the ring electrode 22. The processing circuit 26d in this case only needs to detect the uplink signal US during the transmission of the downlink signal DSb by using the pen-tip electrode 21.

In addition, the present disclosure is also applicable to a case where the transmission and reception of the uplink signal US and the downlink signal DS are executed in time slot units. As the time slot, for example, a period (blank period) in which noise generated in the display 32 decreases is preferably used. In this case, a plurality of time slots are set in the frame described above.

FIG. 14 is a diagram for illustrating signals transmitted and received between the active pen 2 and the sensor controller 31 in a case where the transmission and reception of the uplink signal US and the downlink signal DS are executed in time slot units. FIG. 14 illustrates a case in which the processing circuit 26d of the active pen 2 executes the carrier modulation process similar to that in FIG. 10, and the same is also true for a case in which the carrier modulation process similar to those in FIG. 11 to FIG. 13 is executed. As can be understood from FIG. 14, the active pen 2 and the position detection system 1 can preferably execute the carrier modulation process described above even in a case where the transmission and reception of the uplink signal US and the downlink signal DS are executed in time slot units.

DESCRIPTION OF REFERENCE SYMBOLS

1: Position detection system
2: Active pen
3: Electronic apparatus
3a: Touch surface
20 Core body
21: Pen-tip electrode
22: Ring electrode
23: Pressure sensor
24: Side switch
25 Battery
26: Integrated circuit
26a: Boost circuit
26b: Transmission circuit
26c: Reception circuit
26d: Processing circuit
27: Stop filter
28, 33: Wireless communication circuit
30: Sensor
31: Sensor controller
32: Display
34: Host processor
COM: Command
CRC: Error detection code
DATA: Data signal
DS, DSa to DSc: Downlink signal
GID: Global identifier
LID, NLID: Local identifier
POS1, POS2: Position signal
PRE: Pen pressure value
SW: Switch information
US: Uplink signal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active pen comprising:
a signal processing circuit which, in operation, transmits, at a second timing decided based on a first timing of reception of a first uplink signal received from a sensor controller, a position signal and a data signal from a pen-tip electrode, and receives a second uplink signal; and
a first wireless communication circuit which, in operation, wirelessly communicates with the sensor controller,
wherein the signal processing circuit, in operation, determines whether the second uplink signal has been received at the second timing, and in a case of determining that the second uplink signal has not been received, the signal processing circuit transmits at least part of the data signal via the first wireless communication circuit while transmitting the position signal from the pen-tip electrode.

2. The active pen according to claim 1, further comprising:
a pressure sensor which, in operation, detects a pen pressure value,
wherein, in a case where the pen pressure value detected by the pressure sensor indicates that the active pen is in contact with a touch surface, the signal processing circuit transmits the at least part of the data signal via the first wireless communication circuit while transmitting the position signal from the pen-tip electrode.

3. The active pen according to claim 1,
wherein the signal processing circuit switches the first wireless communication circuit from a power-saving mode to a normal mode before transmitting the at least part of the data signal via the first wireless communication circuit.

4. The active pen according to claim 3,
wherein, in a case where the signal processing circuit determines that the second uplink signal has not been received, the signal processing circuit transmits the position signal from the pen-tip electrode, performs a detection operation of the second uplink signal, and transitions to a dual transmission mode in which the at least part of the data signal is transmitted via the first wireless communication circuit, and
wherein, in a case where the second uplink signal has been detected by the detection operation performed in the dual transmission mode, the signal processing circuit transitions to the normal mode in which the data signal is transmitted from the pen-tip electrode.

5. A position detection system comprising:
the active pen according to claim 1; and
the sensor controller,
wherein the sensor controller, in operation, outputs data indicated by the data signal transmitted by the active pen from the pen-tip electrode and data indicated by the data signal transmitted by the active pen via the first wireless communication circuit, to a host processor as data from a same active pen.

6. The position detection system according to claim 5,
wherein the sensor controller is connected to a sensor coupled with the pen-tip electrode through capacitive coupling and a second wireless communication circuit which, in operation, wirelessly communicates with the active pen, and receives, via the sensor, the position signal and the data signal transmitted from the pen-tip electrode, while receiving, via the second wireless communication circuit, the data signal transmitted by the active pen via the first wireless communication circuit.

7. The position detection system according to claim 5,
wherein the data signal transmitted by the active pen from the pen-tip electrode and the data signal transmitted by the active pen via the first wireless communication circuit include common identification information,
wherein, in a case of having received the data signal transmitted by the active pen from the pen-tip electrode, the sensor controller, in operation, outputs, to the host processor, transmission data of the active pen included in the data signal in association with the common identification information included in the data signal, and
wherein, in a case of having received the data signal transmitted by the active pen via the first wireless communication circuit, the sensor controller, in operation, outputs, to the host processor, the transmission data of the active pen included in the data signal in association with the common identification information included in the data signal.

8. The position detection system according to claim 5,
wherein the active pen further includes a pressure sensor which, in operation, detects a pen pressure value,
wherein the signal processing circuit, in operation, modulates the position signal based on the pen pressure value detected by the pressure sensor, and
wherein, in a case where the pen pressure value indicated by the position signal indicates that the active pen is not in contact with a touch surface, the sensor controller does not output, to the host processor, transmission data of the active pen included in the data signal transmitted by the active pen via the first wireless communication circuit.

9. The position detection system according to claim 8,
wherein the signal processing circuit, in operation, modulates the position signal by frequency modulation, spread spectrum, or phase modulation.

10. An integrated circuit that is used with an active pen, the integrated circuit comprising:
a signal processing circuit which, in operation, transmits, at a second timing decided based on a first timing of reception of a first uplink signal received from a sensor controller, a position signal and a data signal from a pen-tip electrode, and receives a second uplink signal, and
a first wireless communication circuit which, in operation, wirelessly communicates with the sensor controller,
wherein the signal processing circuit, in operation, determines whether the second uplink signal has been received at the second timing, and in a case where the signal processing circuit determines that the second uplink signal has not been received, at least part of the data signal is transmitted via the first wireless communication circuit while the position signal is transmitted from the pen-tip electrode.

11. An active pen comprising:
a processing circuit which, in operation, generates a downlink signal to be transmitted to a sensor controller; and
a transmission circuit which, in operation, transmits the downlink signal by changing a potential of an electrode provided at a pen tip,
wherein the processing circuit, in operation, performs a carrier modulation process in which, while the downlink signal is generated based on a first carrier signal in a case where the active pen is in a contact state, the downlink signal is generated based on a second carrier signal different from the first carrier signal in a case where the active pen is in a hovering-state, state,
wherein a phase of the second carrier signal is different from a phase of the first carrier signal,
wherein the processing circuit, in operation, generates the downlink signal based on a third carrier signal with a predetermined phase in a first period, while executing the carrier modulation process in a second period that is after the first period,
wherein a difference of between a phase of the first carrier signal and a phase of the third carrier signal is a first value, and
wherein a difference of between a phase of the second carrier signal and a phase of third carrier signal is a second value different from the first value.

12. The active pen according to claim 11,
wherein a frequency of the second carrier signal is different from a frequency of the first carrier signal.

13. The active pen according to claim 12, further comprising:
a reception circuit that, in operation, receives a first uplink signal transmitted by the sensor controller,
wherein the processing circuit, in operation, performs the carrier modulation process in a case where the reception circuit does not receive a second uplink signal at a second timing decided based on a first timing of reception of the first uplink signal received by the reception circuit.

14. The active pen according to claim 13,
wherein the downlink signal generated by the carrier modulation process is a position signal that is an unmodulated first carrier signal or an unmodulated second carrier signal.

15. The active pen according to claim 12, further comprising:
a reception circuit that, in operation, receives first uplink signal transmitted by the sensor controller,
wherein the processing circuit starts the carrier modulation process at a second timing decided based on a first timing of reception of the first uplink signal received by the reception circuit.

16. The active pen according to claim 15,
wherein the downlink signal generated by the carrier modulation process is at least one of a position signal that is an unmodulated first carrier signal or an unmodulated second carrier signal and a data signal that is obtained by modulating the first carrier signal or the second carrier signal by data transmitted to the sensor controller.

17. The active pen according to claim 11, further comprising:
a reception circuit that, in operation, receives a first uplink signal transmitted by the sensor controller,
wherein the processing circuit, in operation, performs the carrier modulation process in a case where the reception circuit does not receive a second uplink signal at a second timing decided based on a reception timing of the second first uplink signal received by the reception circuit.

18. The active pen according to claim 17,
wherein the downlink signal generated based on the third carrier signal is a position signal that is an unmodulated third carrier signal, and
wherein the downlink signal generated by the carrier modulation process is a position signal that is an unmodulated first carrier signal or an unmodulated second carrier signal.

19. The active pen according to claim 11, further comprising:
a reception circuit that, in operation, receives a first uplink signal transmitted by the sensor controller,
wherein the processing circuit, in operation, decides a start timing of each of the first period and the second period at a second timing decided based on a reception timing of the first uplink signal received by the reception circuit.

20. The active pen according to claim 19,
wherein the downlink signal generated based on the third carrier signal is a position signal that is an unmodulated third carrier signal, and
wherein the downlink signal generated by the carrier modulation process is a data signal obtained by modulating the first carrier signal or the second carrier signal by data transmitted to the sensor controller.

21. A position detection system comprising:
the active pen according to claim 11; and
the sensor controller,
wherein the sensor controller, in operation, determines whether a carrier signal of the downlink signal received from the active pen is the first carrier signal or the second carrier signal, and determines whether the active pen is in contact with a touch surface, based on a result determining whether the carrier signal of the downlink signal received from the active pen is the first carrier signal or the second carrier signal.

22. The position detection system according to claim 21,
wherein a frequency of the second carrier signal is different from a frequency of the first carrier signal, and
wherein the sensor controller, in operation, receives the downlink signal by a detection circuit that, in operation, detects a predetermined frequency, and determines whether the carrier signal of the downlink signal is the first carrier signal or the second carrier signal, according to a change in phase output by the detection circuit as a result of receiving the downlink signal.

23. A position detection system comprising:
the active pen according to claim 19; and
the sensor controller,
wherein the sensor controller, in operation, detects a phase of a carrier signal of the downlink signal at each of a first timing after transmission of the first uplink signal and a second timing after the first timing, and determines whether the active pen is in contact with a touch surface, based on a difference between the phase of the carrier signal of the downlink signal at the first timing and the phase of the carrier signal of the downlink signal at the second timing.

\* \* \* \* \*